United States Patent [19]
Nomura

[11] Patent Number: 5,818,651
[45] Date of Patent: Oct. 6, 1998

[54] MOTOR CONTROL DEVICE FOR INFORMATION RECORDING AND REPRODUCING APPARATUS

[75] Inventor: Masaru Nomura, Tenri, Japan

[73] Assignee: Sharp Kabushiki Kaisha, Osaka, Japan

[21] Appl. No.: 624,058

[22] Filed: Mar. 29, 1996

[30] Foreign Application Priority Data

Apr. 4, 1995 [JP] Japan .................................... 7-079197

[51] Int. Cl.$^6$ .................................................. G11B 5/596
[52] U.S. Cl. ..................... 360/78.06; 360/75; 360/77.02
[58] Field of Search .................................. 360/60, 69, 75, 360/77.02, 77.03, 78.06, 78.04; 73/514.01, 514.39; 369/53

[56] References Cited

U.S. PATENT DOCUMENTS

| | | | |
|---|---|---|---|
| 4,860,271 | 8/1989 | Yokogawa et al. ............... | 369/44.34 X |
| 4,862,298 | 8/1989 | Genheimer et al. . | |
| 5,257,255 | 10/1993 | Morimoto et al. ......................... | 369/53 |
| 5,299,075 | 3/1994 | Hanks .................................... | 360/75 X |
| 5,412,809 | 5/1995 | Pam et al. . | |
| 5,426,545 | 6/1995 | Sidman et al. ......................... | 360/75 X |
| 5,521,772 | 5/1996 | Lee et al. .................................... | 360/75 |
| 5,581,521 | 12/1996 | Nomura et al. ......................... | 369/53 X |

FOREIGN PATENT DOCUMENTS 6-52563  2/1994  Japan .

OTHER PUBLICATIONS

Suminto, J. et al. "Piezoresistive Accelerometer and Method of Fabrication", WIPO International Publication No. WO 92/15018, Published Sep. 3, 1992.

K. Onishi "Control of Electric Motor and Robot", *Journal of the Institute of the Electrical Engineers of Japan*, vol. 110, No. 8, pp. 657–660, 1990.

*Primary Examiner*—Aristotelis M. Psitos
*Assistant Examiner*—Larry T. Cullen
*Attorney, Agent, or Firm*—David G. Conlin; William J. Daley, Jr.

[57] ABSTRACT

A motor control device of an information recording and reproducing apparatus has a disturbance observer for outputting a compensating voltage signal. The compensating voltage signal compensates for a drive voltage signal of a head-moving swing motor on the basis of the drive voltage signal and a detected signal from a velocity sensor detecting an angular velocity of the swing motor. In such a motor control device, amplitude of the drive voltage signal inputted into the disturbance observer is limited by a limiter not to exceed a maximum amplitude at which a driver of the motor generates a maximum drive signal for the motor within the drive ability of the driver. Therefore, even if an input signal to the motor is too great because the uncompensated drive voltage signal is excessive or external disturbance affects the swing motor, the amplitude of the signal inputted to the motor is limited. In other words, even if the input signal is too great, the compensating voltage signal is not affected. Consequently, the swing motor is not driven excessively and it is possible to precisely control relative movement and position of the head to a magnetic disk.

19 Claims, 25 Drawing Sheets

ACCELERATION DETECTING DIRECTION

MOTOR CONTROL DEVICE FOR INFORMATION RECORDING AND REPRODUCING APPARATUS

FIELD OF THE INVENTION

The present invention relates to a motor control device for servo control or access control adopted in an information recording and reproducing apparatus such as an optical disk apparatus.

BACKGROUND OF THE INVENTION

The tracking servo control and the access control are widely used in a disk apparatus such as an optical disk apparatus and a magnetic disk apparatus. The tracking servo control positions over a target track of a disk medium an optical pickup or head which records information into the disk and/or reproduces information out of the disk. The access control moves the optical pickup or head quickly to the target track. The disk apparatus, therefore, has a motor mechanism for moving the optical pickup or head in a radial direction of the disk in order to carry out such controls.

Generally, the motor mechanism control characteristics are prone to external disturbances: sensitivity (parameter) variation, vibration, shock and characteristic distortion such as mechanical resonance. Researches have been conducted in order to solve such problems.

A study addressing such problems in an attempt to realize control of robot joints is reported in "Dendouki oyobi robot no seigyo" (Control of electric motor and robot) by Kouhei Onishi, the Journal of the Institute of the Electrical Engineers of Japan Vol. 110, No. 8 (1990), page 657–600. In the study, deviation from the ideal characteristics and responses caused by external disturbances is all considered to result from a disturbance torque in the dimension in which the disturbances to the motor are defined. A so-called disturbance observer method, in which all the disturbance torques are estimated all together and then fed back to the motor, is adopted in the study.

FIG. 28 shows a system adopting the disturbance observer. FIG. 29 shows the system redrawn through an equivalent conversion.

In the system shown in FIG. 29, the right half of the disturbance observer 63 carries out the processes of:

(a) converting angular velocity $\omega$ of the motor 61 into angular acceleration by approximately differentiating the angular velocity $\omega$ detected by a sensor in a band whose upper angular frequency limit is g, and (b) multiplying g (a gain reduction in the approximate differentiation) with Jn (a nominal value of the moment of inertia) to determine the entire torque $T_1$ including the drive torque Tm and the disturbance torque Tdis.

Meanwhile, the left half of the disturbance observer 63 multiplies I (a current for driving the motor 61) by K$\tau$n (a nominal value of the torque constant) in order to determine $T_2$ (a nominal value of the drive torque).

Tdis' (an estimated disturbance torque) is then calculated by subtracting the above-determined entire torque $T_1$ from the nominal value of the drive torque $T_2$. Next, the estimated disturbance torque Tdis' is multiplied by the reciprocal number of the nominal value of the torque constant K$\tau$n to determine a compensation current Icmp to reduce and attenuate affection by the disturbance torque Tdis.

The compensation current Icmp is then added to Ia$^{ref}$ (a reference value of the current for driving the motor 61) in order to find the actual value of the motor drive current. The motor 61 finally receives this actual value and is driven by the actual motor drive current. Described so far has been how a system incorporating the disturbance observer 63 works to reduce and attenuate various affections by the disturbance to the motor. Consequently, the transfer function from the reference value of the motor drive current Ia$^{ref}$ to a rotation angle $\eta$ can be fixed at the value of K$\tau$n/(Jn·s$^2$) which is determined by the nominal values of both the torque constant and the moment of inertia. The 's' here and in FIGS. 28 and 29 denote the Laplace operator.

It should also be noted that FIG. 29 shows that the motor 61 has a viscosity constant term D, but the disturbance observer 63 has no block to determine the viscosity constant term D. This is because the viscosity D is included in the disturbance torque Tdis which is all together reduced and attenuated.

The low-pass filter 63c in the left half of the disturbance observer 63, having a gain of g/(s+g), is provided as a result of the equivalent conversion. The low-pass filter 63c blocks signal of frequencies higher than the upper angular frequency limit g, while not affecting that of frequencies lower than the upper angular frequency limit g. The approximate differentiation is carried out in the band lower than the upper angular velocity.

However, when the above disturbance observer is adopted for controlling a motor, the motor may be driven excessively in response to a great disturbance, such as a great input, vibration and shock.

Referring to FIGS. 29 and 30, the cause of the excessive motor drive is explained as follows in reference to another aspect of the disturbance observer.

a) Operations of loops in the disturbance observer.

As shown in FIG. 29, the system of a motor control device has two feedback loops, a positive feedback loop and a negative feedback loop. The positive feedback loop, functioning as a positive feedback, estimates and determines the torque $T_2$ and does not include the controlled motor. The negative feedback loop, functioning as a negative feedback, estimates the entire torque $T_1$ and includes the controlled motor.

Attention should be paid to the positive feedback loop in the system. As mentioned earlier, the low-pass filter is provided as a result of the equivalent conversion and determine s the operating band width (controlling bandwidth) of the disturbance observer. In frequencies (to be more precise, in angular frequencies) lower than the upper limit g of the bandwidth of the low-pass filter, the gain Gp caused during one round of the loop is given by the equation:

$$Gp = K\tau n \times (1/K\tau n). \tag{1}$$

In principle, Gp equals 1. When the positive feedback loop is closed without the negative feedback loop, it is easy to calculate, referring to FIG. 29, the transfer function from Ia$^{ref}$ to I of:

$$1/(1-Gp) \tag{2}$$

and the transfer function from Ia$^{ref}$ to Icmp of:

$$Gp/1-Gp). \tag{3}$$

Both denominators in Equations (2) and (3) equal 0. The positive feedback loop without the negative feedback loop therefore diverges or saturates.

However, as clear from FIG. 29, the positive feedback loop combined with the negative feedback loop, normally, does neither diverge nor saturate. When the positive feedback loop is about to diverge or saturate, the motor 61 would receive a very strong signal I from the positive feedback loop which would drive the motor 61 excessively without the negative feedback loop. However, the negative feedback loop including the approximate differentiation process feeds back the excessive drive which is about to happen and thus restrains the amplitude of the signal I.

In other words, the negative feedback loop including the motor 61 and the positive feedback loop not including the motor 61 work in antagonism with each other to stabilize operations of the disturbance observer 63. The transfer function from the input Ia$^{ref}$ to the motor output rotation angle θ is fixed, as mentioned earlier, at Kτn/(Jn·s$^2$).

b) Drive ability of the driver (drive means).

Description of the driver (drive means) 60 has been omitted in the discussion so far for convenience. But, actually, as shown in FIG. 30, a driver 60 is used in order to drive the motor 61. If the driver 60 has an enough large drive ability, there occurs no problem. Otherwise, the positive and negative feedback loops do not work in antagonism with each other, and the motor 61 is thus driven excessively. The excessive drive may result in a runaway, collision, or, in the least desirable case, breakdown of the motor 61.

Here, easy example values are used to further explain the positive and negative feedback loops not working in antagonism with each other. What follows is assumed values for parameters of components in the block diagram FIG. 30:

| | | |
|---|---|---|
| Kτ | = | torque constant of motor (actual value) |
| | = | 1.0 [N · m/A] |
| J | = | moment of inertia of motor (actual value) |
| | = | 0.1 [kg · m$^2$] |
| Kτn | = | torque constant of motor (nominal value) |
| | = | 1.0 [N · m/A] |
| Jn | = | moment of inertia of motor (nominal value) |
| | = | 0.1 [kg · m$^2$] |

$K_D$ = gain of driver = 1.0 [A/V];
Imax = maximum drive ability of driver = ±1.0 [A]
C = sensitivity of velocity sensor = 0.1 [V · s].

The block of the disturbance observer 63 in FIG. 30 is redrawn from that in FIG. 29 through the equivalent conversion as much as possible. In addition, a velocity (angular velocity) sensor 62 for detecting velocity (angular velocity) is added in FIG. 30.

In the following description and calculations, electric current and voltage are not distinguished from each other unless necessary. Therefore, units describing current and voltage are treated as equivalent regardless of the units used above. For example, the actual value of the torque constant denotes a torque amount generated by the current. So does the nominal value of the torque constant.

In contrast, when the disturbance observer 63 is actually composed of electric circuits, it is more convenient to use in the following description voltage signal which can be regarded as equivalent to current. This enables the operation of the driver (i.e., an inputted drive voltage signal (described in unit [V]) is converted into a drive current signal (described in unit [A]) of the same value in order to be outputted to a motor) to be regarded as a conversion from the voltage dimension to the current dimension.

Along the same lines as above, the drive voltage reference value Va$^{ref}$ which can be regarded as equivalent to the motor drive current Ia$^{ref}$ will be used in the following description when necessary.

It is assumed that the motor control device receives as the Va$^{ref}$ a voltage input of 1 [V] from servo control means (not shown) provided outside in order to perform the servo operation. The driver 60 converts the input voltage into a drive current I and then supplies the drive current I to the motor 61. The equation for the conversion is:

$$1[V] \times 1.0[A/V] = 1[A].$$

The motor 61 is driven by the drive current I and rotates at an angular acceleration of:

$$(K\tau/J) \times I = 10[s^{-2}/A] \times 1.0[A] = 10[s^{-2}].$$

In other words, the motor 61 rotates at an angular velocity of:

$$10 \times (1/s)[s^{-1}].$$

Note that the viscosity constant term D of the motor 61 is omitted from the equations for convenience, and that the 's' not in brackets '[]' denote the Laplace operator. The brackets '[]' are used to show that the letters in them denote units.

The angular velocity is detected by the velocity sensor 62 as a voltage of:

$$10 \times (1/s)[s^{-1}] \times 0.1[V \cdot s] = 1 \times (1/s)[V].$$

Then, the detected angular velocity (voltage) passes the block 63b in the negative feedback loop and is inputted into the approximate differentiation block 63d. The gain at the block 63b is given by the equation:

$$Jn/C = 1.0[N \cdot m \cdot s/V].$$

The approximate differentiation block 63d outputs a signal T$_1$ equivalent to a torque of 1 [N·m]. The outputted signal T$_1$ is, ordinarily, expressed in the form of a voltage signal.

Meanwhile, the block 63a in the positive feedback loop receives an input Va$^{ref}$ of 1 [V] and outputs a signal T$_2$ equivalent to a torque of 1 [N·m]. The gain at the block 63a is Kτn.

The signal T$_1$ equivalent to a torque of 1 [N·m] outputted from the negative feedback loop is subtracted from the signal T$_2$ by the comparator 63e. Thus, the estimated disturbance torque Tdis', i.e., the output of the comparator 63e, equals 0.

As described so far, if the drive voltage reference value Va$^{ref}$ does not exceed the drive ability of the driver 60, the positive and negative feedback loops work in antagonism with each other, and the motor 61 is driven according to the inputted drive voltage reference value Va$^{ref}$. If the drive voltage reference value Va$^{ref}$ falls, the motor slows down accordingly. Therefore, there occurs no irregular motion.

On the other hand, if the motor control device receives the drive voltage reference value Va$^{ref}$ exceeding the maximum drive ability of the driver 60, the motor 61 reacts in a different manner. Let's assume that the motor control device receives an inputted Va$^{ref}$ of 5 [V]. Since no compensation voltage Vcmp is yet generated after the excessive input, the adder 64 outputs the drive voltage signal V of 5 [V]. The driver 60 is therefore about to convert the drive voltage signal V into a current of 5 [A] and supply the current to the motor. However, since the maximum drive current Imax is limited to 1 [A], the driver 60 actually supplies to the motor 61 the current I of:

$$I = Imax = 1 [A].$$

As a result, although the drive voltage signal V is great, the angular acceleration and the angular velocity of the motor 61 do not exceed 10 [s$^{-2}$] and 10×(1/s) [s$^{-1}$] respectively just like in the case where V=1 [V]. Therefore, the velocity sensor 62 detects this angular velocity and outputs a voltage of 1×(1/s) [V]. The approximate differentiation block 63d in the negative feedback loop outputs a signal $T_1$ equivalent to a torque of 1 [N·m].

Meanwhile, the block 63a in the positive feedback loop receives a drive voltage signal V of 5 [V] and outputs a signal $T_2$ equivalent to a torque of 5 [N·m]. The gain at the block 63a is Kτn. The comparator 63e subtracts from the signal $T_2$ the signal $T_1$ equivalent to a torque of 1 [N·m] outputted from the negative feedback loop. Even after the subtraction, there still remains a signal (an estimated disturbance torque Tdis') equivalent to 4 [N·m]. The block 63f converts the remaining signal to a compensation current Icmp, i.e., a compensation voltage Vcmp of 4 [V]. The gain at the block 63f is given by the equation:

$$1/K\tau n = 1.0 [A/N \cdot m].$$

The adder 64 on the input side of the disturbance observer 63 adds the Vcmp of 4 [V] to the drive voltage reference value $Va^{ref}$. Consequently, the disturbance observer 63 and the driver 60 receive a drive voltage signal V of 9 [V] this time.

Nevertheless, the motor 61 can only rotate at the angular acceleration of 10 [s$^{-2}$] in response to the greater drive voltage signal V because the angular acceleration depends on the drive ability of the driver 60. Therefore, the negative feedback loop can only detect and output the signal $T_1$ equivalent to a torque of 1 [N·m], whereas the positive feedback loop can only detect and output the signal $T_2$ equivalent to a torque of 9 [N·m]. The comparator 63e thus outputs the difference between the signals $T_1$ and $T_2$ which amounts to a signal equivalent to a torque of 8 [N·m]. The greater signal generates a greater Vcmp of 8 [V] which is then fed back and inputted to the driver 60.

The second-time compensation voltage Vcmp is even greater than the first-time compensation voltage Vcmp of 4 [V] as clearly shown here. If no more drive voltage reference value $Va^{ref}$ is inputted after the compensation voltage Vcmp reaches 9 [V], the comparator 63e repeatedly subtracts the signal $T_1$ outputted from the negative feedback loop from the signal $T_2$ outputted from the positive feedback loop until the signal fed back into the disturbance observer 63 converges to 0. But, the convergence process takes time.

In the above example, the driver 60 continues driving the motor 61 with the maximum drive current Imax (=1 [A]) until the absolute value of the output from the adder 64 is less than 1 [V]. Even if no more $Va^{ref}$ is inputted in order to stop the motor 61 at a desired position (i.e. rotation angle) θ, the motor 61, not stopping immediately, overruns and can not be controlled precisely. Besides, the motor 61 and/or a mechanism and component connected to the motor 61 may break down.

On the contrary, suppose a shock or vibration which induces disturbance torque Tdis is applied to the motor 61 when the motor is not rotating and no drive voltage reference value $Va^{ref}$ is inputted. In this case, the nominal value $T_2$ of the drive torque equals 0. But the motion of the motor 61 caused by the disturbance torque Tdis is detected by the velocity sensor 62. The entire torque $T_1$ is therefore outputted in accordance with the disturbance torque Tdis.

Consequently, the comparator 63e outputs $-T_1$ as an estimated disturbance torque Tdis'. The block 63f converts the estimated disturbance torque Tdis' into a compensation voltage Vcmp. The adder 64 then outputs the compensation voltage Vcmp to the positive feedback loop. However, since the drive current reference value $Va^{ref}$ still equals 0, the drive voltage signal V inputted to the driver 60 equals the compensation voltage Vcmp. The motor 61 is thus driven by the drive voltage signal V (=Vcmp) in the opposite direction from the disturbance. The displacement induced by the disturbance thus seems to be compensated for.

But, motion of the motor 61 above, caused by an external disturbance, is not generated by an electrical drive and not limited by the drive ability of the driver 60. Therefore, the compensation voltage Vcmp above may exceed the drive voltage signal V corresponding to the maximum drive current Imax.

Just as in the case of the excessive drive voltage reference value $Va^{ref}$, it takes time for the motion of the motor 61 to converge. The motor 61 thus overruns.

As described above, in the conventional motor control device, the positive and negative feedback loops in the disturbance observer do not work in antagonism with each other when the motor control device receives great disturbance, such as a great input, vibration and shock, which exceeds the ability of the driver. Therefore, the motor is driven excessively and can not be controlled precisely. Alternatively, in the case where the motor has a limited drive ability, the motor may be driven beyond its ability, which leads to a breakdown of the motor itself and/or of mechanisms and components connected to the motor.

Such problems are not unique to the motor control device and the disturbance observer for a general rotary motor, but may also occur to a liner motor often incorporated in an optical disk device and a rotary motor incorporated in a magnetic disk device.

Moreover, irregular motion of the motors greatly affect information recording and reproducing apparatuses, such as optical disk devices and magnetic disk devices because the motors move precise and fragile mechanisms and components, such as optical pickups and a magnetic heads. Considering advantages of the disturbance observer in reducing and attenuating characteristics change of the motors and affection by external disturbance, it is desirable to adopt the disturbance observer controlling the motor of the apparatus. However, it has been very difficult to realize the control.

SUMMARY OF THE INVENTION

In view of the above problems, an object of the present invention is to provide a motor control device which can prevent a motor from being driven excessively in response to disturbance and a great input exceeding the drive ability of a driver.

In order to accomplish the object, a motor control device of an information recording and reproducing apparatus in accordance with the present invention has:

a head for recording information into a disk-shaped recording medium and/or reproducing information out of a disk-shaped recording medium;

a motor for moving the head over the disk-shaped recording medium;

a driver for generating a drive signal for driving the motor according to an input signal;

a detector for detecting an operating condition of the head moved by the motor;

an observer for generating, in response to the input signal and a detected signal from the detector, a compensation signal compensating for an external disturbance applied to the motor and a change in characteristics of the motor, and for compensating for the input signal in accordance with the compensation signal; and a limiter for limiting amplitude of the input signal inputted into the observer so that the amplitude does not exceed a maximum amplitude at which the driver generates a maximum drive signal within the drive ability of the driver.

With the arrangement, the signal inputted into the driver is compensated for by the observer on the basis of the compensation signal. The amplitude of the compensated input signal is limited by the limiter not to exceed the maximum amplitude at which the driver generates the maximum driver signal within the drive ability of the driver. Therefore, even if the input signal exceeds the drive ability of the driver because the input signal or the compensating signal caused by disturbance is too great, the amplitude of the signal inputted into the observer does not exceed the maximum amplitude.

As the result, since the amplitude of the compensation signal from the observer is limited, the input signal does not exceed the drive ability of the driver. The motor can be thus prevented from being driven excessively. Consequently, it is possible to precisely control the motor and prevent the motor from overrunning and damaging the motor itself and peripherals of the motor.

In the above motor control device, the detector is preferably an acceleration detector for detecting the operating condition of the head through acceleration. The motor control device of such an arrangement does not need to carry out a differentiation process in the observer, whereas a motor control device incorporating a velocity detector does. Therefore, the motor control device incorporating the acceleration detector does not need an amplifier having a high gain proportional to the bandwidth in which the differentiation process is carried out, thereby reducing the circuit arrangement in size. Compared to the motor control device incorporating the velocity detector, the motor control device incorporating the acceleration detector can also considerably reduce noise and affection from noise of the peripherals.

The above acceleration detector preferably detects a relative acceleration between movable and stationary sections of the motor. The movable section is for moving the head of the motor. With the arrangement, the acceleration detector can precisely detect the relative acceleration of the movable section to the stationary section which is caused by vibration, shock and a reaction from the movable section to the stationary section when the motor is driven.

Alternatively, the above acceleration detector includes a piezoelectric converter for converting into an electric signal, amount of distortion of the piezoelectric converter mechanically caused by the acceleration. The following kinds of piezoelectric converters can be used for this purpose:

(1) a piezoelectric converter for detecting electric charge caused by a force applied to a piezoelectric element, (2) a piezoelectric converter for detecting a resistance value variation when acceleration is applied to a piezoelectric resistor provided on a silicon substrate, and (3) a piezoelectric converter for detecting variation in electrostatic capacity when acceleration is applied to a capacitor having movable electrodes provided on a silicon substrate.

It is easy to produce these kinds of piezoelectric converters in a small size. These kinds of piezoelectric converters therefore have few restrictions in selecting a mounting position for the converters and can provide an acceleration detector which can be fitted even in a small motor. Besides, the piezoelectric converters can reduce various affections such as electric noise induction.

Additional objects, nature and novel features of the invention will be set forth in the description which follows. For a fuller understanding of the advantages of the invention, reference should be made to the ensuing detailed description taken in conjunction with the accompanying drawings.

BRIEF DESCRIPTION OF THE DRAWINGS

FIG. 5($b$) is a circuit diagram showing an arrangement of a reference voltage source of the limiter in FIG. 4, which serves as a DC power source for supplying a negative voltage.

DESCRIPTION OF THE EMBODIMENTS

First Embodiment

Referring to FIGS. 1 through 12, the following description will discuss an embodiment in accordance with the present invention.

A magnetic disk device of the present embodiment has a motor control device for controlling a swing motor.

Figure 2:
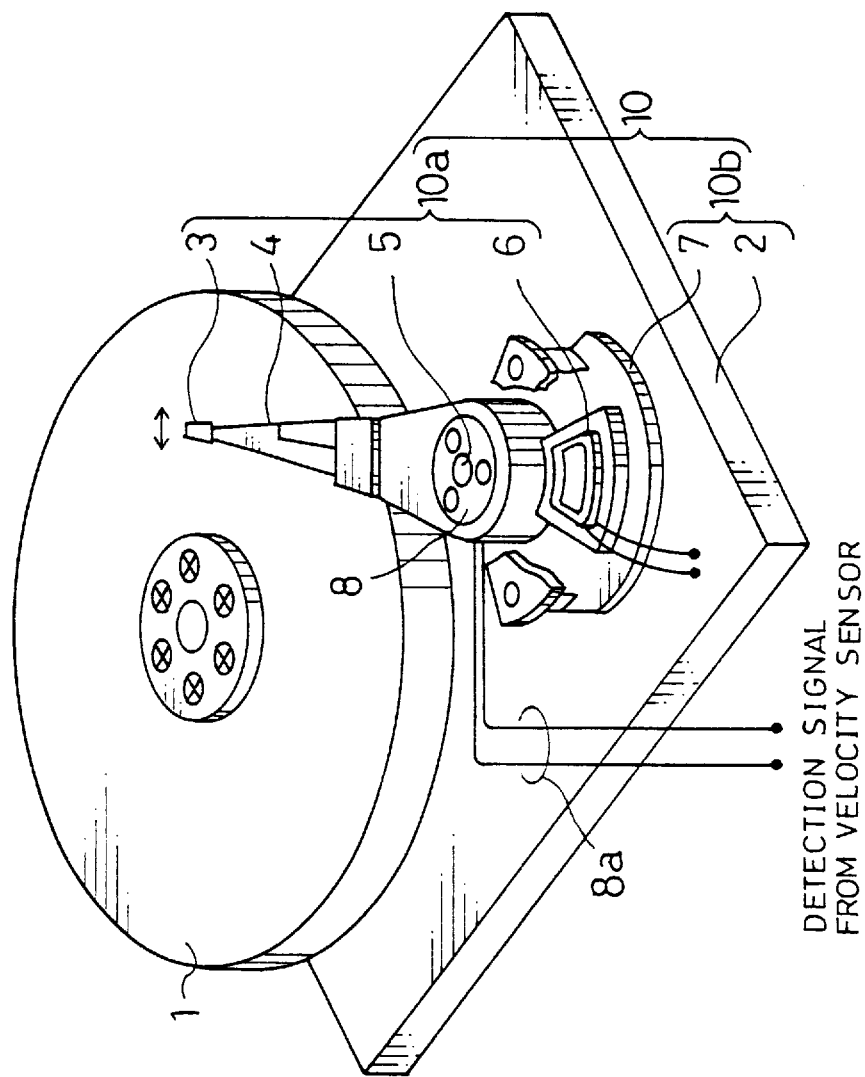
FIG. 2 is a perspective view showing an arrangement of main parts of an information recording and reproducing device incorporating the motor control device.

As shown in FIG. 2, the magnetic disk device has a head 3 (a recording and reproducing means) positioned over a magnetic disk (disk-shaped recording medium) 1 which is driven to rotate by a spindle motor (not shown). The head 3 is provided on the tip of a swing arm 4 so that the head 3 can move in a radial direction of the magnetic disk 1. The head 3 records information into the disk and/or reproduces out of the disk. The swing arm 4 rotates around a rotation axis 5.

The swing arm 4 has a drive coil 6. A chassis 2 has a permanent magnet 7. The drive coil 6 and the permanent magnet 7 compose a drive force generating section of the swing motor 10. The swing motor 10 drives the swing arm 4 by utilizing a electromagnetic force generated by the permanent magnet 7 and the electrified drive coil 6.

The swing arm 4, a part of a movable section 10a of the swing motor 10, has a velocity sensor 8 for detecting angular velocity of the swing arm 4 relative to the chassis 2 of a stationary section 10b of the swing motor 10. The signal detected by the velocity sensor 8 is inputted to a disturbance observer (not shown) through a signal line 8a.

The velocity sensor 8 may vary in arrangement. However, the velocity sensor in the present embodiment is a conventional sensor adopting the same principle as a DC generator utilizing electro motive force generated by a coil rotating in a magnetic field.

Figure 1:
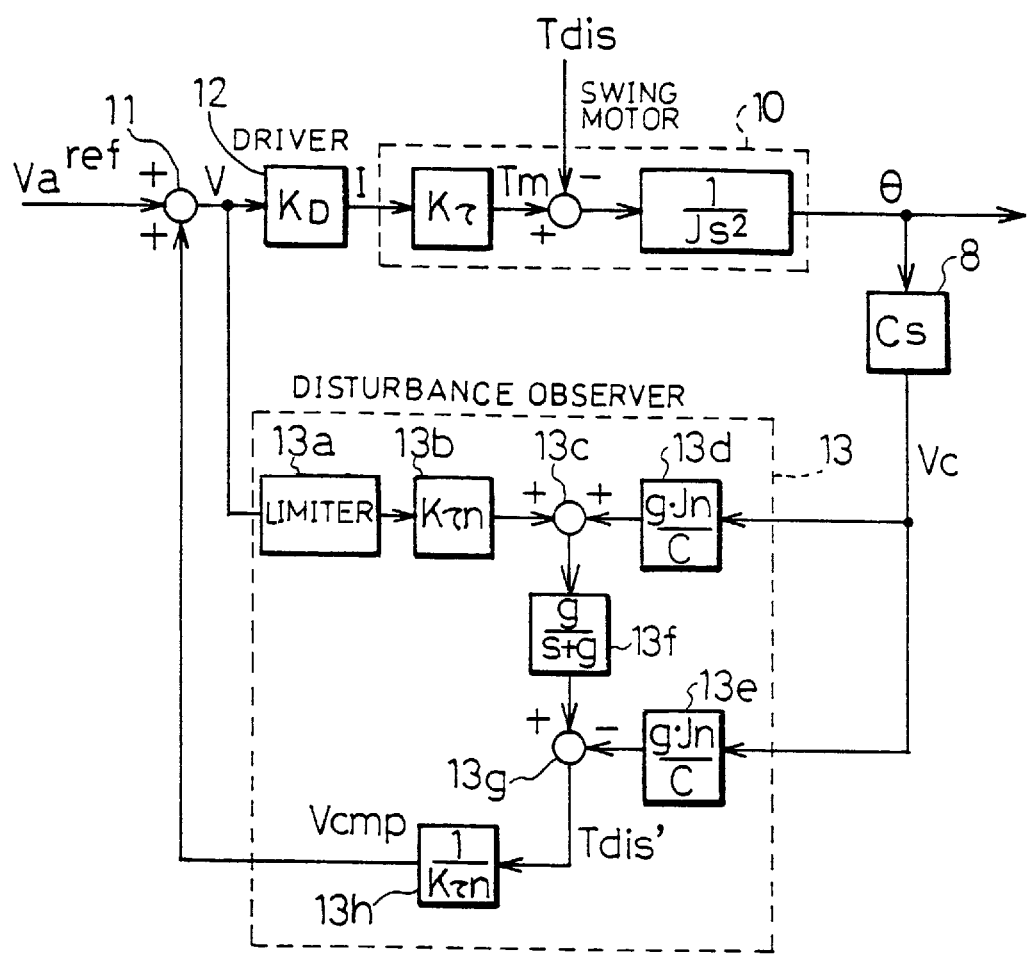
FIG. 1 is a block diagram showing an arrangement of a motor control device of an embodiment in accordance with the present invention.

FIG. 1 is a block diagram showing the motor control device including the disturbance observer.

A signal for driving the swing motor 10, which is to be controlled by the motor control device, is inputted to the adder 11 as a drive signal reference value $Va^{ref}$ from another controller (not shown). The controller is, for example, servo error signal generating means or a micro computer. The adder 11 outputs a drive voltage signal V to a driver 12 and a disturbance observer 13.

Note that in the following description, a signal described in a capital letter V is a voltage and its unit is [V], and a signal described in a capital letter I is a current and its unit is [A].

The driver 12 converts the drive voltage signal V into a drive current signal I of the same absolute value as the drive voltage signal V and then outputs the drive current signal I to the swing motor 10. The driver 12 has a maximum output ability of ±Imax. The swing motor 10 can be described as a second-order integral system having a torque constant Kτ and a moment of inertia of the rotatable section J. All the disturbances (i.e., the disturbance torque Tdis) including friction, viscosity, parameter variation and vibration are assumed to affect the swing motor 10.

The velocity sensor 8 detects angular velocity of the swing motor 10 and then outputs the angular velocity to the disturbance observer 13. Since the output of the swing motor 10 is described as a rotation angle θ in FIG. 1, the velocity sensor 8 detects the differentiated value of the rotation angle θ. Therefore, the velocity sensor 8 is expressed in the form in which the Laplace operator s, denoting a differentiation, is affixed to a detection sensitivity C.

The drive voltage signal V outputted from the adder 11, a signal inputted to the disturbance observer 13, is inputted to a limiter (amplitude limiter) 13a. Then, the limiter 13a limits a maximum amplitude of the drive voltage signal V so that it does not exceed $\pm V_{LIM}$, and inputs the amplitude limited signal to an amplifier 13b having a gain of Kτn. The amplifier 13b outputs a signal to one of the two input terminals of an adder 13c. A detected signal Vc from the velocity sensor 8, another signal inputted to the disturbance observer 13, is inputted to amplifiers 13d and 13e having a gain of g·Jn/C.

The 'g' is the upper limit of the bandwidth where an approximate differentiation is carried out in order to convert the velocity signal (described later) to an acceleration signal. 'Jn' is a nominal value of the moment of inertia of the movable section 10a of the swing motor 10. An output of the amplifiers 13d and 13e, cancelling the sensitivity C of the velocity sensor 8, is the angular velocity of the swing motor 10 multiplied by (g·Jn).

The amplifier 13d outputs a signal to the other terminal of the adder 13c. The adder 13c outputs a signal to a low-pass filter 13f having a low frequency gain of 1 and an upper bandwidth limit of g. The subtracter 13g receives at a positive input terminal thereof the signal passing the filter and at a negative input terminal thereof the signal outputted from the amplifier 13e.

The subtracter 13g outputs an estimated entire disturbance torque Tdis' which includes the disturbance torque Tdis, a difference between the parameter Kτ of the swing motor 10 and its nominal value Kτn, and a difference between the parameter J of the swing motor 10 and its nominal value Jn. The estimated entire torque is converted into a compensation voltage signal Vcmp for compensating the Tdis' by an amplifier 13h and then inputted into the adder 11. The amplifier 13h has a gain of 1/Kτn (the reciprocal number of the nominal value of the torque constant).

In FIG. 1, if the signal amplitude is not limited by the limiter 13a, the transfer function from V and Vc (the signals inputted into the disturbance observer 13) to Tdis' is given by the equation:

$$\text{Tdis}' = K\tau n \times [g/(s+g)] \times V - (g \times Jn/C) \times [s/(s+g)] \times Vc. \quad (4)$$

Figure 3:
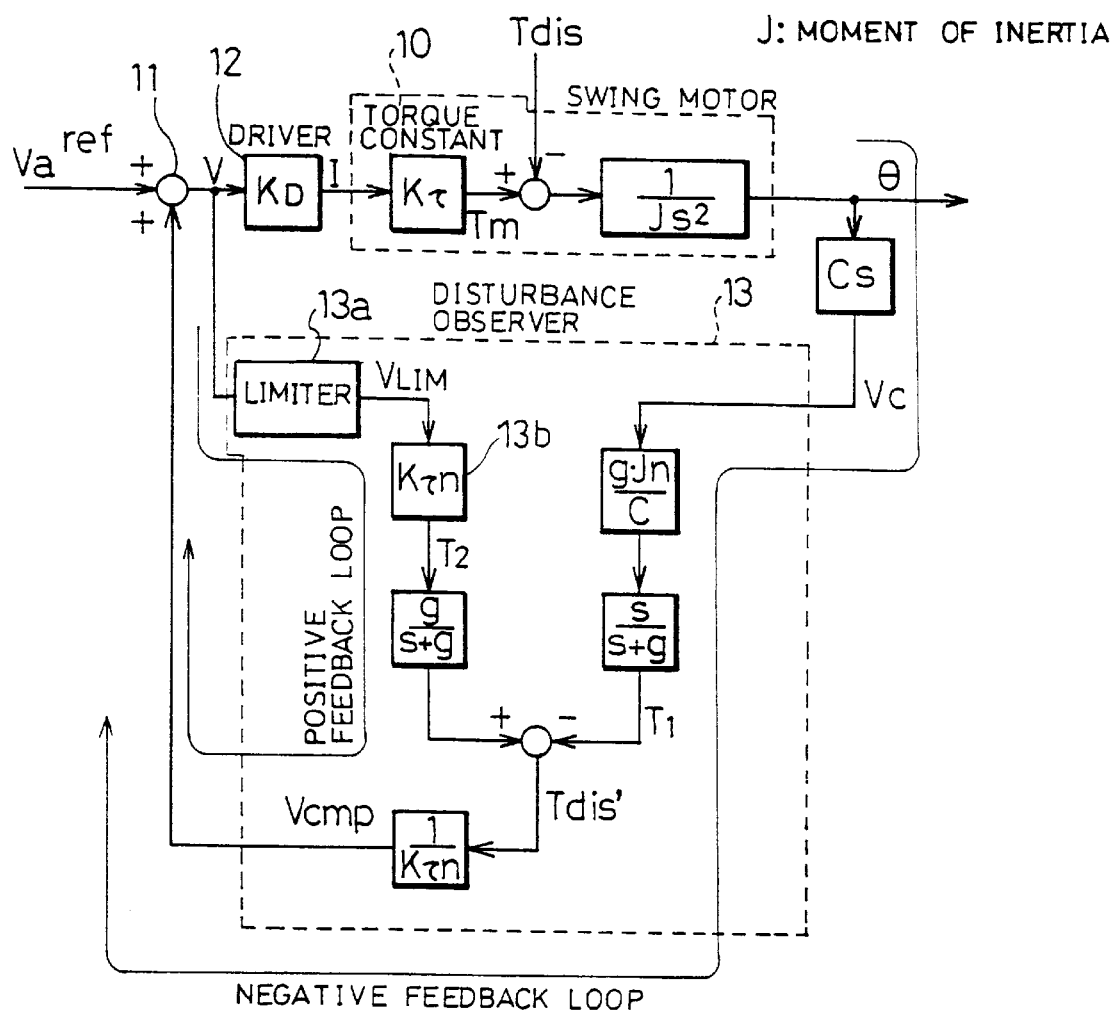
FIG. 3 is a block diagram showing an arrangement of the motor control device adopting a disturbance observer equivalently converted.

Therefore, it is possible to redraw FIG. 1 into FIG. 3 based on Equation (4). In the left half of the disturbance observer 13 in FIG. 3, a torque $T_2$ in the case where the torque constant of the swing motor 10 equals its nominal value $K\tau n$ is determined based upon the drive voltage signal inputted into the disturbance observer 13 from the adder 11. Then a bandwidth limitation is carried out by a low-pass filter having a transfer function of $g/(s+g)$. In the right half of the disturbance observer 13 in FIG. 3, the detected signal Vc from the velocity sensor 8 is multiplied by the gain $g \times Jn/C$. Then an approximate differentiation is carried out by a high-pass filter having a transfer function of $s/(s+g)$ in the bandwidth whose upper limit is g.

Hence, considering that $s/(s+g)$ is nearly equivalent to $s/g$, a signal component of the detected signal Vc not exceeding the upper limit g of the bandwidth goes through an equation of:

$$(g \times Jn/C) \times (s/g) = Jn \times s/C \quad (5)$$

The denominator C of the right-hand side of Equation (5) cancels the sensitivity of the velocity sensor 8. Therefore, in the right half of the disturbance observer 13, the angular velocity of the swing motor 10 is converted into angular acceleration through the differentiation and multiplied by the nominal value Jn of the moment of inertia. Thus, the disturbance torque Tdis and an entire torque $T_1$ are estimated under the conditions that the moment of inertia equals its nominal value Jn. The entire torque $T_1$, including an actual drive torque Tm based on the drive current signal I, is a torque applied to the movable section 10a of the swing motor 10.

Next, referring to FIG. 3, the following description will confirm effect of the disturbance observer 13. Firstly, transfer functions from the drive signal reference value $Va^{ref}$ and the disturbance torque Tdis to the rotation angle θ of the swing motor 10 will be determined without considering the existence of the driver 12 and the limiter 13a. The following equations are obtained from FIG. 3:

$$\theta = (1/Js^2) \times (K\tau \times V - \text{Tdis}) \quad (6)$$

$$\text{Vcmp} = (K\tau n \times V - Jn \times s^2 \times \theta)/K\tau n \quad (7)$$

$$V = Va^{ref} + \text{Vcmp}. \quad (8)$$

Note that the driver 12, having a gain of 1, is an element for converting the drive signal V into the drive current signal I of the same absolute value as the drive signal V and then outputting the drive current signal I to the swing motor 10. Therefore, the gain of the driver 12 is, unless necessary, omitted in Equations (6), (7), (8) and in all equations hereafter.

Note further that these equations are only concerned with each frequency component (expressed by the Laplace operator $s = 2\pi$) composing the signal lower than the upper limit of the bandwidth g. Therefore, with respect to the transfer function of the high-pass filter and the low-pass filter, Equations (6), (7) and (8) are obtained under conditions that $s/(s+g)$ nearly equals $(s/g)$ and that $g/(s+g)$ nearly equals 1.

With the substitution of Equation (6) and (7), Equation (8) is rearranged as:

$$V = [(K\tau n/Jn)/(K\tau/J)] \times Va^{ref} + (1/K\tau) \times \text{Tdis}. \quad (9)$$

With the substitution of Equation (9), Equation (6) is rearranged as:

$$\begin{aligned}\Theta &= [(K\tau/(J \times s^2)] \times [(K\tau n/Jn)/(K\tau/J)] \times Va^{ref} + \\ &\quad [(K\tau/(J \times s^2 \times K\tau)] \times \text{Tdis} - \\ &\quad [1/(J \times s^2)] \times \text{Tdis} \\ &= [(K\tau n/(Jn + s^2)] \times Va^{ref} \end{aligned} \quad (10)$$

As clear from Equation 10, the rotation angle of the swing motor 10 relative to the drive signal reference value Varef is determined by the nominal values of the torque constant $K\tau n$ and of the moment of inertia Jn which are also regarded as the amplifier's gains in the disturbance observer 13. The rotation angle of the swing motor 10 is not affected by the actual parameters of the swing motor 10, such as $K\tau$ and J, or the disturbance torque Tdis.

Described so far has been the effects of the motor control device adopting the disturbance observer.

Next, the limiter 13a will be described in more detail, including setting up an amplitude limiting voltage $V_{LIM}$ (hereafter, referred to as the limiter voltage).

As described earlier in the explanation about the background of the invention, the controlled motor can be driven excessively for the following reason. The disturbance observer 13 has a negative feedback loop including the driver 12 and a positive feedback loop not including the driver 12. The driver 12 limits the current so that it does not exceed the maximum drive current Imax, and thus suppresses the signal amplitude. Therefore, the signal amplitude of the negative feedback loop is smaller than that of the positive feedback loop.

To solve the problem, not only the negative feedback loop, but also the positive feedback loop should have current limiting function. The positive feedback loop with the current limiting function can be realized by the addition to the positive feedback loop of the limiter 13a having the limiter voltage $V_{LIM}$ wherein $$T_1 \geq T_2. \quad (11)$$

Here, $T_1$ and $T_2$ are the estimated and calculated values of the torque respectively when the driver 12 is supplying the maximum drive current Imax to the motor.

The equation to decide the limiter voltage $V_{LIM}$ varies depending on the place of the limiter 13a in the positive feedback loop. In the following description, the limiter 13a is provided, as shown in FIGS. 1 and 3, before the amplifier 13b whose gain equals the nominal value of the torque constant $K\tau n$. The driver 12 has a current-voltage conversion gain of $K_D$ so that the system is more widely applicable. So far in the description, the motor has been explained to receive the drive current signal I equivalent to the inputted drive voltage signal V. However, by introducing the gain $K_D$, it is now possible to use instead the description of:

$$K_D = 1[A/V].$$

When the driver 12 supplies the maximum drive current Imax to the swing motor 10, a voltage $V_1$, inputted into the driver 12 is given by the equation:

$$V_1 = (1/K_D) \times \text{Imax}. \quad (12)$$

When the limiter 13a is about to start the amplitude limitation of $V_{LIM}$, a voltage $V_2$ inputted into the limiter 13a, i.e., into the positive feedback loop of the disturbance observer 13, is given by the equation:

$$V_2 = V_{LIM}. \quad (13)$$

The voltage $V_2$ is also inputted into the driver 12.

When $V_1$ and $V_2$ are given, the estimated or calculated values of the torques $T_1$ and $T_2$ in negative and positive feedback loops respectively are given by the equations:

$$T_1 = [K_D \times (K\tau J) \times Jn] \times V_1 \quad (14)$$

$$T_2 = K\tau n \times V_2. \quad (15)$$

By rearranging Equation (11) with Equations (12), (13), (14) and (15), the limiter voltage $V_{LIM}$ of the limiter 13a is given by the equation:

$$V_{LIM} \leq [(K\tau/J)/(K\tau n/Jn)] \times \text{Imax} \quad (16)$$

Alternatively, when the limiter 13a is placed right after the amplifier 13b having a gain of $K\tau n$, Equations (13) and (15) are replaced with the following Equations (13') and (15'):

$$V_2 = V_{LIM}/K\tau n, \quad (13')$$

$$T_2 = K\tau n \times V_2 = V_{LIM}. \quad (15')$$

Along the same lines as above, the limiter voltage $V_{LIM}$ of the limiter 13a is given by the equation:

$$V_{LIM} \leq [(K\tau/J)/(1/Jn)] \times \text{Imax} \quad (16')$$

In Equations (13'), (15') and (16'), the left-hand side and the right-hand side have different physical dimensions even when the above-mentioned mixed use of the voltage dimension and the current dimension is taken into account. This is because the limiter 13a is placed after the amplifier 13b having the gain equivalent to the original torque constant $K\tau n$. In this case, the limiter 13a may be considered to limit the torque by limiting a signal level of voltage dimension instead.

When the left-hand side and the right-hand side are equal to each other in Equation (16) or (16'), the signal amplitude of the positive feedback loop is not limited until the signal amplitude reaches the maximum drive current Imax of the driver 12. Therefore, the motor control system including the disturbance observer 13 can operate to its best ability. In other words, the value is the optimum operating conditions for the limiter 13a.

However, the limiter voltage $V_{LIM}$ set slightly lower than the optimum value does not pose any practical problem. This is, in fact, more preferable in protecting the driver 12 because the limiter voltage $V_{LIM}$ of the limiter 13a is set lower than the maximum operating ability of the driver 12.

The addition of the limiter 13a does not affect durability of the disturbance observer 13 against the parameter variation and the external disturbance and the like. As mentioned earlier, suppression of the parameter variation and the external disturbance is carried out only within the ability of the driver 12 supplying the drive current signal I to the swing motor 10. Besides, it is impossible to drive the swing motor 10 in a manner exceeding the ability of the driver 12 during access operation.

Accordingly, even if the amplitude of the drive voltage signal inputted into the disturbance observer 13 is limited so that the driver 12 supplies not more than the maximum drive current Imax or supplies the drive current signal I slightly lower than Imax, there is no change at all or only minimal change in the performance of the disturbance observer 13 in the access operation and the durability of the disturbance observer 13 against the external disturbance.

Referring to FIGS. 4 through 7, the following description will discuss the limiter 13a and its circuit arrangements.

Figure 4:
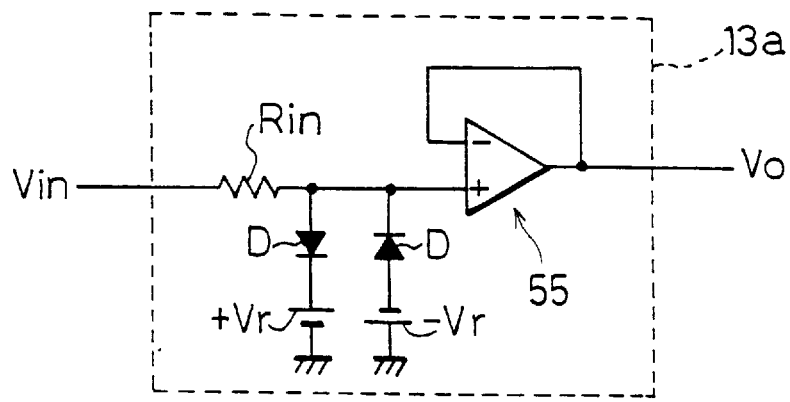
FIG. 4 is a circuit diagram showing an arrangement of a limiter of the motor control device.
Figure 5:
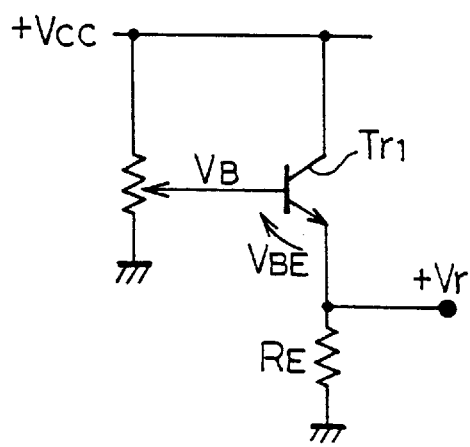
FIG. 5($a$) is a circuit diagram showing an arrangement of a reference voltage source of the limiter in FIG. 4, which serves as a DC power source for supplying a positive voltage.
Figure 5:
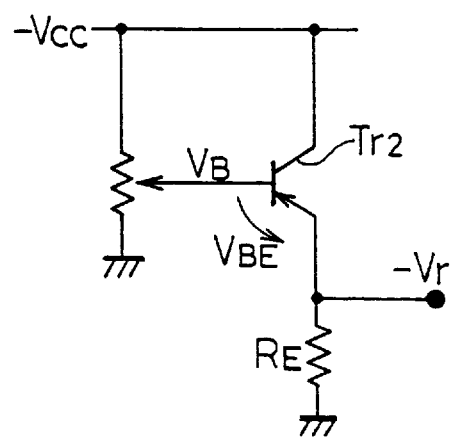

FIG. 4 shows a circuit arrangement example of the limiter 13a. The limiter 13a has two circuits in each of which a diode D is connected in the reverse bias direction to a DC power source which supplies positive or negative voltages of ±Vr. The circuits are connected in reverse parallel and supplied with a signal Vin from the previous circuit through a resistor Rin. A voltage follower 55 is provided at the connecting point of the resistor Rin and the diodes D. The voltage follower 55 includes an operational amplifier (hereafter, referred to as an OP amplifier) and serves as a buffer.

The limiter 13a of such an arrangement limits the amplitude of an output voltage $V_o$ to $\pm V_{LIM} = \pm(Vr+V_D)$. $V_D$ denotes a diode forward voltage of the diode D. $V_D$ of a germanium diode is approximately 0.2 to 0.3 [V]. $V_D$ of a silicon diode is approximately 0.6 to 0.7 [V].

Practically, batteries can not be used as the DC power sources of the positive and negative polarity in the arrangement shown in FIG. 4. Instead, the DC power sources can be realized by emitter-follower circuits composed of transistors as shown in FIGS. 5(a) and 5(b).

The absolute value of the output Vr, the voltage source, in FIG. 5(a) is smaller than the absolute value of a base voltage $V_B$ of the transistor $Tr_1$ by the amount equal to the absolute value of a base-emitter voltage $V_{BE}$ of the transistor $Tr_1$. The amount is nearly equivalent to the diode forward voltage $V_D$ of the diode D. The same is true with the output −Vr and the transistor $Tr_2$ in FIG. 5(b). Therefore, ±Vr is given by the equation: $\pm Vr = \pm(|V_B| - |V_{BE}|)$. A source voltage of the motor control device can be used as a voltage ±Vcc necessary to obtain the base voltage $V_B$.

Figure 6:
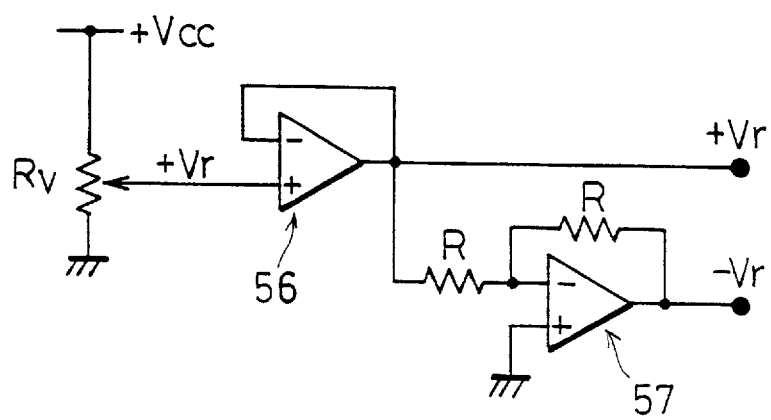
FIG. 6 is a circuit diagram showing another arrangement of a DC power source of the limiter in FIG. 4.

It is also possible to arrange the DC voltage sources of ±Vr with a circuit shown in FIG. 6 instead of the above emitter-follower circuit. In the circuit in FIG. 6, a higher voltage +Vcc is divided into a lower voltage of +Vr by a variable resistor Rv. The voltage of +Vr is outputted at the same voltage from a voltage follower 56 incorporating an OP amplifier. The voltage of +Vr outputted from the voltage follower 56 is then converted (inverted and amplified) to a voltage of −Vr by an inverting amplifier 57 having a gain of −1.

In the emitter-follower circuit, it is impossible to reduce the absolute value of the Vr to a value smaller than the absolute value of the base-emitter voltage $V_{BE}$ of the transistor. Besides, it is difficult to make an output impedance Zo (of the voltage source) small enough. Specifically, Zo roughly equals $R_E/h_{fe}$. '$R_E$' denotes a resistor connected to the emitter while $h_{fe}$ denotes a current amplification factor of the transistors.

On the other hand, in the circuit arrangement shown in FIG. 6, it is possible to reduce the absolute value of Vr down to 0 [V]. Besides, the output impedance is very low and can be virtually regarded as 0 [Ω].

Figure 7:
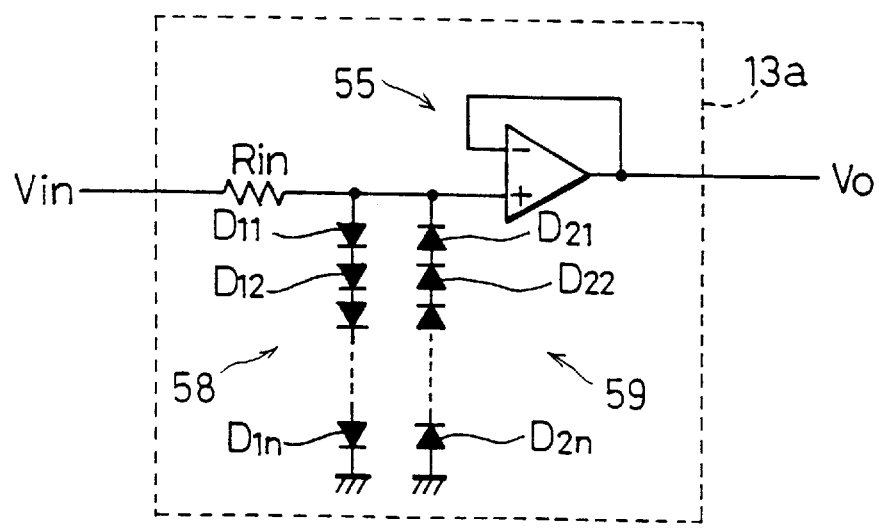
FIG. 7 is a circuit diagram showing another arrangement of the limiter of the motor control device.

It is possible to utilize as the limiter 13a the circuit shown in FIG. 7 instead of the circuit shown in FIG. 4. The circuit does not need DC voltage sources if diode forward voltages are arranged as shown in FIG. 7.

To be more specific, groups of diodes 58 and 59 are provided between the ground and the positive input terminal of a voltage follower incorporating an OP amplifier. The diode group 58 constitutes a circuit in which n pieces of diodes $D_{11}$, to $D_{1n}$ are connected in series. The diode group 59 constitutes a circuit in which n pieces of diodes $D_{21}$ to $D_{2n}$ are connected in series in a direction opposite from the diodes $D_{11}$ to $D_{1n}$.

The voltage source is obtained from the diode forward voltage $V_D$ in the limiter 13a of such an arrangement. When all the diodes $D_{11}$ to $D_{1n}$ and $D_{21}$ to $D_{2n}$ are of the same kind (e.g., a silicon diode and no other kind is used) in the limiter 13a, a voltage $V_{LIM}$ for limiting the amplitude of an output voltage $V_o$ equals $\pm n \times V_D$.

It is impossible to exactly set the value of $V_{LIM}$ with such a limiter 13a because $V_{LIM}$ can only take discrete values. However, there is little demand to set the value of $V_{LIM}$ exactly. Therefore, practically, there is no problem with such a limiter 13a. If it is necessary to exactly set the value of $V_{LIM}$, diodes of different kinds should be used in order to set the value of $V_{LIM}$ more precisely.

The following description will discuss actual arrangement examples of the block except for the limiter 13a.

In a block only required to have a certain gain like the amplifier 13b, the resistance value is so set that the desirable gain is obtainable. The resistance value can be set, for example, by connecting in series two inverting and amplifying circuits incorporating OP amplifiers as in FIG. 8. The same is true with the amplifiers 13d, 13e and 13h shown in FIG. 1.

Figure 9:
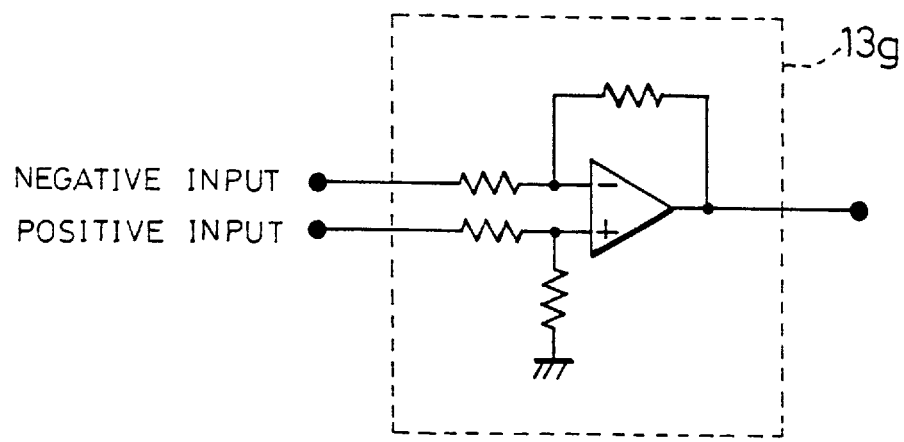
FIG. 9 is a circuit diagram showing an arrangement of a comparator of the motor control device.

The comparator 13g is composed of, for example, a differential amplifying circuit incorporating an OP amplifier as shown in FIG. 9.

Figure 10:
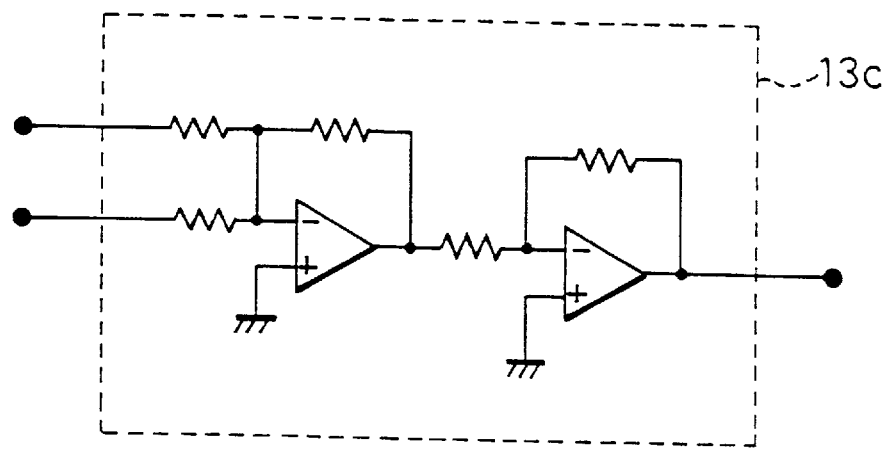
FIG. 10 is a circuit diagram showing an arrangement of an adder of the motor control device.

The adder 13c is composed of, for example, an inverting, adding and amplifying circuit and an inverting and amplifying circuit connected to each other as shown in FIG. 10. Each circuit incorporates an OP amplifier. The adder 11 has the same arrangement.

Figure 11:
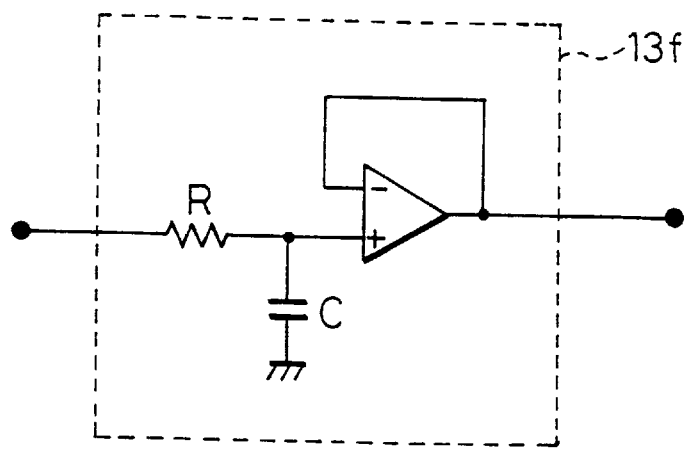
FIG. 11 is a circuit diagram showing an arrangement of an LPF of the motor control device.

The low-pass filter 13f is, for example, as shown in FIG. 11, composed of a voltage follower incorporating an OP amplifier and a first-order RC low-pass filter connected to the positive input terminal of the voltage follower. The first-order RC low-pass filter is made up of a resistor R and a capacitor C. With the upper limit g of the bandwidth given, the resistor R and the capacitor C are so set as to have values satisfying the equation:

$$1/(R \times C) = g.$$

Figure 12:
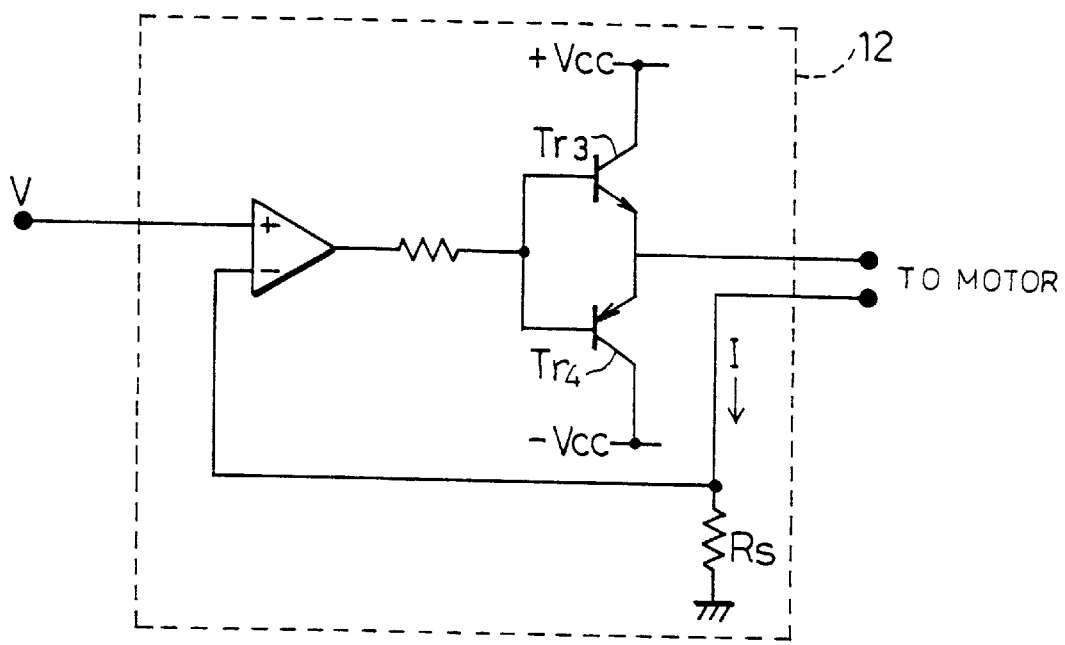
FIG. 12 is a circuit diagram showing an arrangement of a driver of the motor control device.

The driver 12 is composed of, for example, an OP amplifier, power transistors $Tr_3$ and $Tr_4$ and other elements as shown in FIG. 12. In such a circuit, the conversion factor $K_D$ [A/V] for converting the drive voltage signal V to the drive current signal I of the driver 12 equals the reciprocal number of the current detecting resistance Rs, i.e., 1/Rs.

Second Embodiment

Referring to FIGS. 13 through 21, the following description will discuss a second embodiment of the present invention. A motor control device of the present embodiment, provided to an optical disk device, controls a linear motor of the optical disk device and incorporates an acceleration sensor as a detector for detecting motion of the motor.

Figure 13:
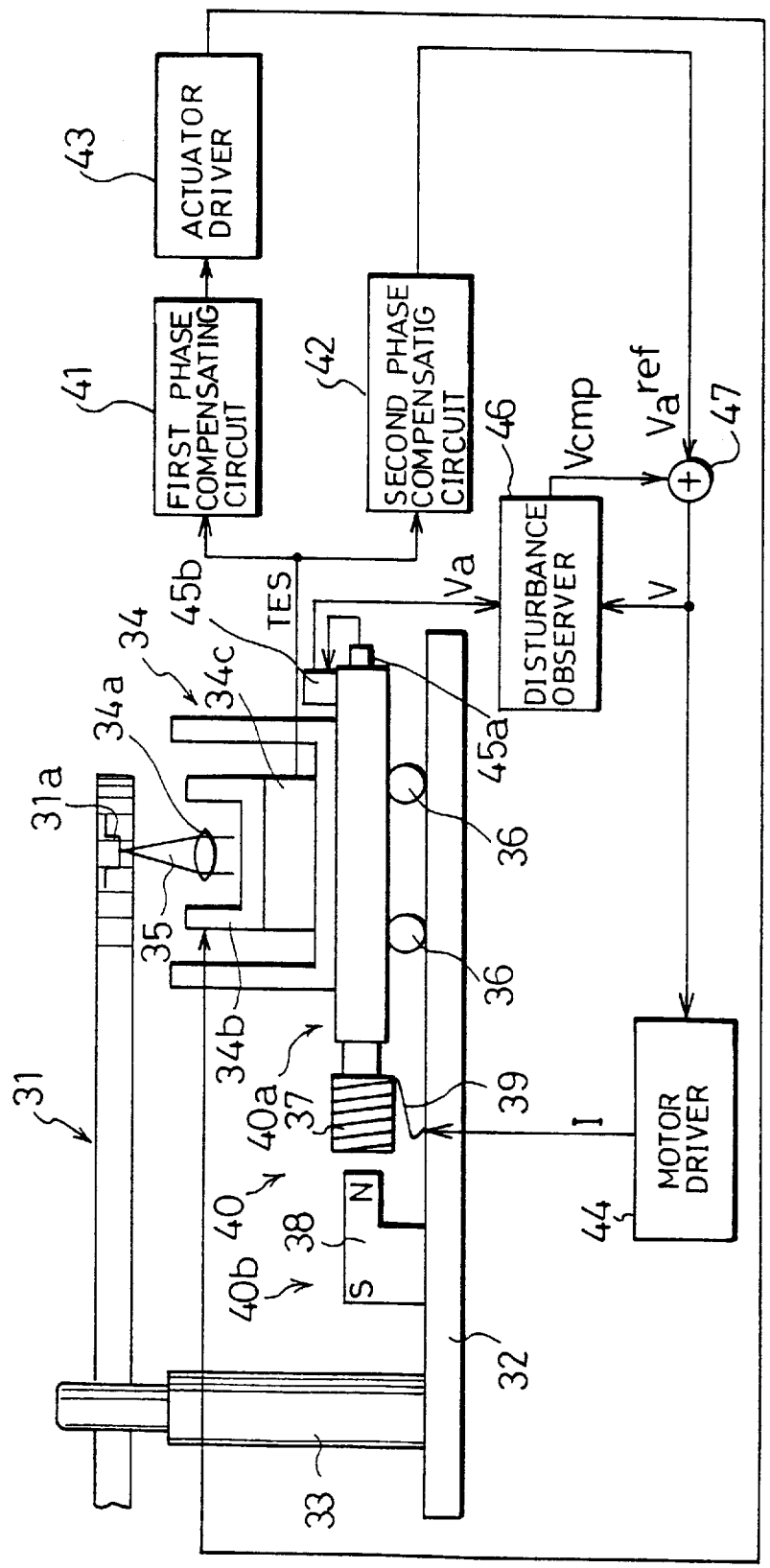
FIG. 13 is a schematic drawing showing an arrangement of a motor section and a circuit section of a motor control device of another embodiment in accordance with the present invention.

As shown in FIG. 13, an optical disk (disk-shaped recording medium) 31 as a recording medium is driven to rotate by a spindle motor 33 mounted on a chassis 32. An optical pickup (recording and reproducing means) 34 is provided to move on the chassis 32 radially inwardly and outwardly below the optical disk 31.

The optical pickup 34 records and/or reproduces information by applying a laser beam 35 focused by an objective lens 34a on a track 31a of the optical disk 31. A drive coil 37 for driving the optical pickup 34 is provided to the optical pickup 34. Rollers (bearings) 36 are provided between the optical pickup 34 and the chassis 32 to move the optical pickup 34.

The chassis 32 has a permanent magnet 38, a guide rail (not shown) for guiding the direction of motion of the optical pickup 34. A linear motor 40 mounted on the chassis 32 moves the optical pickup 34 radially inwardly and outwardly below the optical disk 31 with a drive force generated by a magnetic field of the permanent magnet 38 and the electrified drive coil 37.

The optical disk device has an FPC board (Flexible Printed Circuit Board) 39. The FPC board 39 has wiring for power supply, transmitting detected signals and control signals among the optical pickup 34, the drive coil 37 and a control circuit (not shown). A movable section 40a of the linear motor 40 is constituted of the optical pickup 34, the rollers 36, the drive coil 37 and other members relatively movable to the chassis 32. A stationary section 40b of the linear motor 40 is constituted of the permanent magnet 38, the guiding rail and other members fixed to the chassis 32.

Incidentally, a tracking servo control of the optical disk device serving as a memory device for a computer must control the laser beam 35 so that the laser beam 35 follows, within the error (accuracy) of not exceeding 0.1 micro meters, the track 31a which may be displaced a several tens of micro meters at maximum with rotation of the optical disk 31.

A part of displacement of the track 31a, or to be more specific, a displacement component with a low frequency and a great amplitude is compensated for by the motion of the optical pickup 34 caused by the linear motor 40. Meanwhile, a displacement component of the track 31a with a high frequency and a small amplitude is compensated for by the motion of the objective lens 34a caused by a lens actuator 34b in the optical pickup 34. The tracking servo control adopts such a two-stage servo system with high precision.

In the optical disk device adopting the two-stage servo system, a TES detecting circuit 34c is provided in the optical pickup 34. The TES detecting circuit 34c detects displacement of the laser beam 35 and the track 31a, and outputs a tracking error signal TES.

The optical disk device has first and second phase compensating circuits 41 and 42 and an actuator driver 43. The first and second phase compensating circuits 41 and 42 improves the amplification degree and the frequency characteristics based on the tracking error signal TES. The actuator driver 43 is a circuit for converting an output signal of the first phase compensating circuit 41 into a lens control signal. The lens control signal from the actuator driver 43 is inputted into the lens actuator 34b to drive the lens actuator 34b.

The FPC board 39 transmits the tracking error signal TES from the TES detecting circuit 34c to both the first and second compensating circuits 41 and 42, and transmits the control signal from the actuator driver 43 to the lens actuator 34b. These transmission processes, however, are not shown.

An acceleration sensor 45a and a buffer amplifier 45b are provided close to each other on the motor movable section 40a. The acceleration sensor 45a, composed of a piezoelectric element, mechanically detects acceleration of the motor movable section 40a. The buffer amplifier 45b is a circuit for outputting a signal at a low impedance by buffering and amplifying a signal from the acceleration sensor 45a.

An acceleration sensor unit (acceleration detecting means) 45 is constituted of the acceleration sensor 45a, the buffer amplifier 45b and other members associated with detection of the acceleration.

Figure 16:
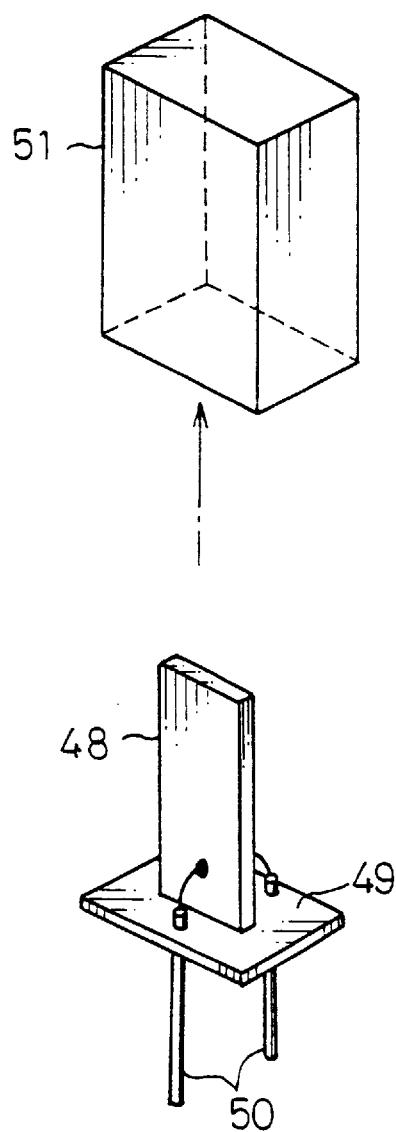
FIG. 16 is a simplified exploded perspective view showing an arrangement of an acceleration sensor incorporated in an acceleration sensor unit of the motor control device in FIG. 14.

The acceleration sensor 45a has a very simple structure. FIG. 16 shows an example of the acceleration sensor 45a composed of a piezoelectric element 48 and electrodes 50. The piezoelectric element 48 is small, a few millimeter long and supported at one edge thereof by a supporter 49. The electrodes 50 are connected to the piezoelectric element 48 and stick out from the supporter 49. Such an acceleration sensor 45a, usually enclosed in a package 51, is small, light and strong. Such a structure has few restrictions upon selecting a mounting position for the acceleration sensor 45a around the linear motor 40. Consequently, the structure gives quite a free hand in design of the liner motor 40. Besides, the linear motor 40 does not need extra space to accommodate the acceleration sensor 45a.

Figure 17:
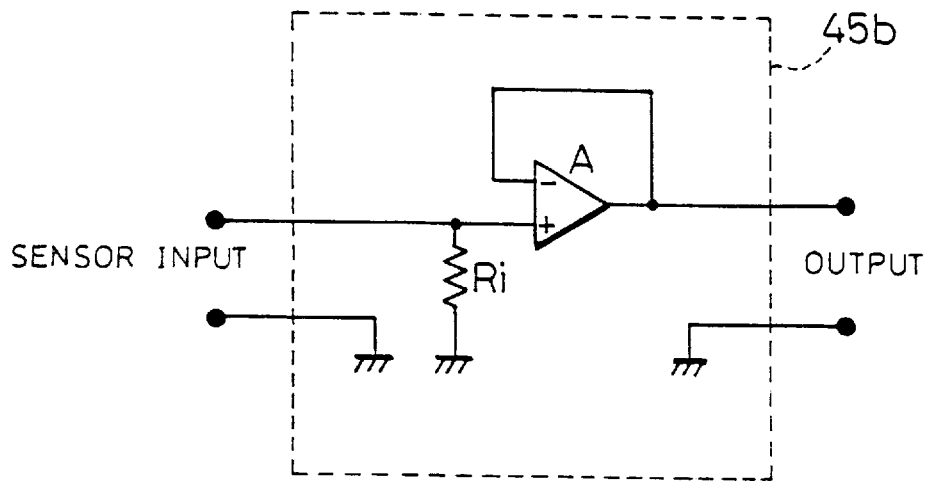
FIG. 17 is a circuit diagram showing an arrangement of a buffer amplifier of the acceleration sensor.

FIG. 17 shows an example of the buffer amplifier 45b, which has a voltage follower incorporating an OP amplifier and an input resistor Ri through which the biased current of the OP amplifier passes.

It is also possible to use as the acceleration sensor unit 45 a piezoelectric resistor element disclosed in 'Air Bags Boom When IC Accelerometer Sees 50 G' (Electronic Design, Aug. 8, 1991 pp. 45–56) by Frank Goodenough. The piezoelectric resistor element has an acceleration sensor, a buffer amplifier and other peripheral circuits integrated on an IC chip by micro machining technology. The following description will discuss the piezoelectric resistor element in detail.

Figure 18:
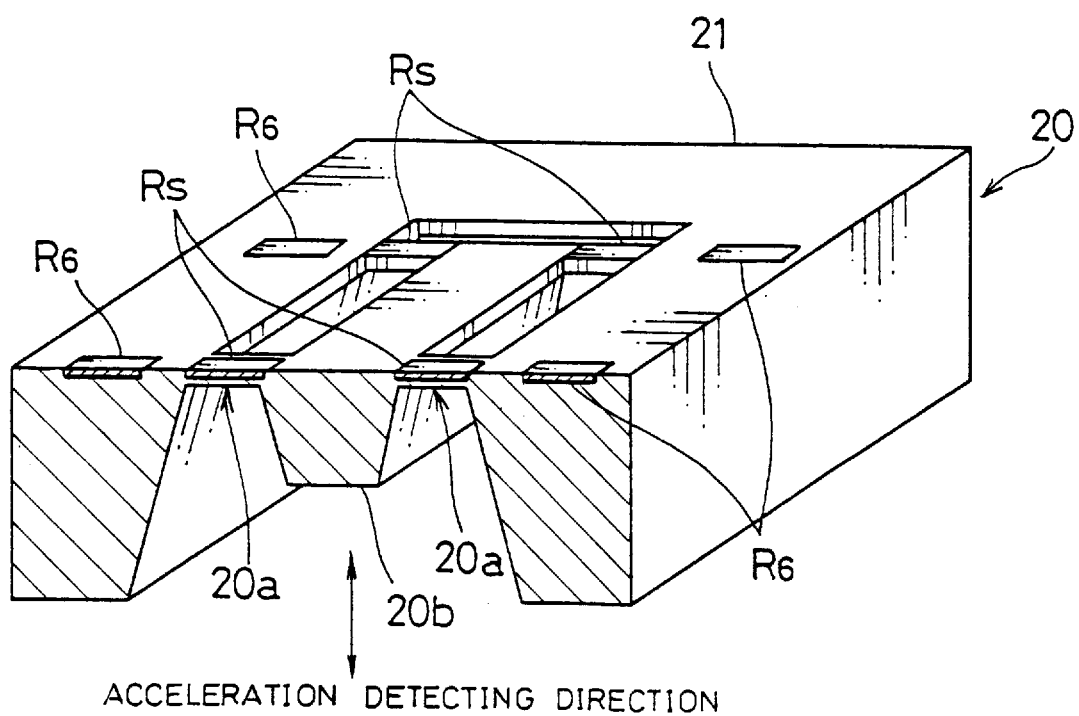
FIG. 18 is a cross-sectional perspective view showing a structure of a piezoelectric resistor element incorporated in another acceleration sensor unit of the motor control device in FIG. 14.

As shown in FIG. 18, the piezoelectric resistor element 20 has a silicon substrate 21 supporting a vibrator 20b with narrow beams 20a. The vibrator 20b is made by etching a part of the substrate 21. A pressure sensitive resistor Rs is provided on each beam 20a by diffusion method. Resistors $R_6$ are provided on the rest of the surface of the substrate 21 to provide resistor bridges.

Figure 19:
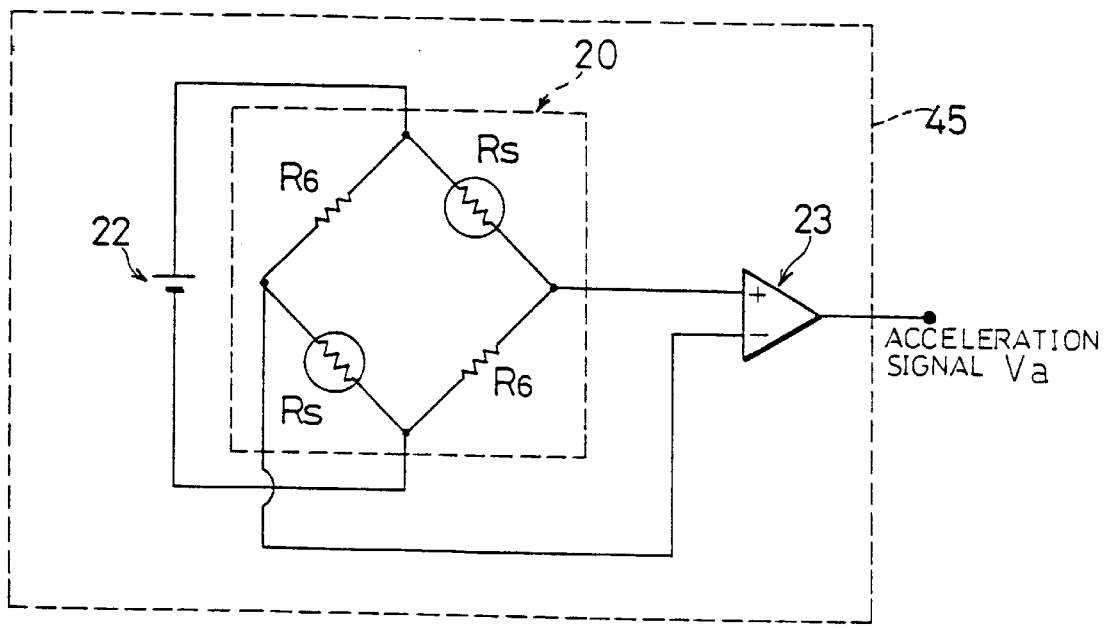
FIG. 19 is a circuit diagram showing an arrangement of an acceleration senor unit incorporating the piezoelectric resistor element.

As shown in FIG. 19, the pressure resistors Rs and the resistors $R_6$ provide the resistor bridges on the piezoelectric resistor element 20. In the acceleration sensor unit 45 incorporating the piezoelectric resistor element 20, when a reference voltage source 22 applies voltage to the resistor bridge, a differential amplifier 23 detects change of the resistance value of the pressure sensitive resistor Rs and outputs the change as an acceleration signal Va.

More specifically, when acceleration is applied to the piezoelectric resistor element 20 in a direction (an acceleration detecting direction) shown in FIG. 18, an force of inertia due to the mass of the vibrator 20b is supported by the beams 20a. The beams 20a is therefore distorted by the force of inertia, and the distortion of the beams 20a changes the resistance values of the pressure sensitive resistors Rs. The differential amplifier 23 detects, as described earlier, imbalance of the resistor bridges caused by the change of the resistance values.

Figure 20:
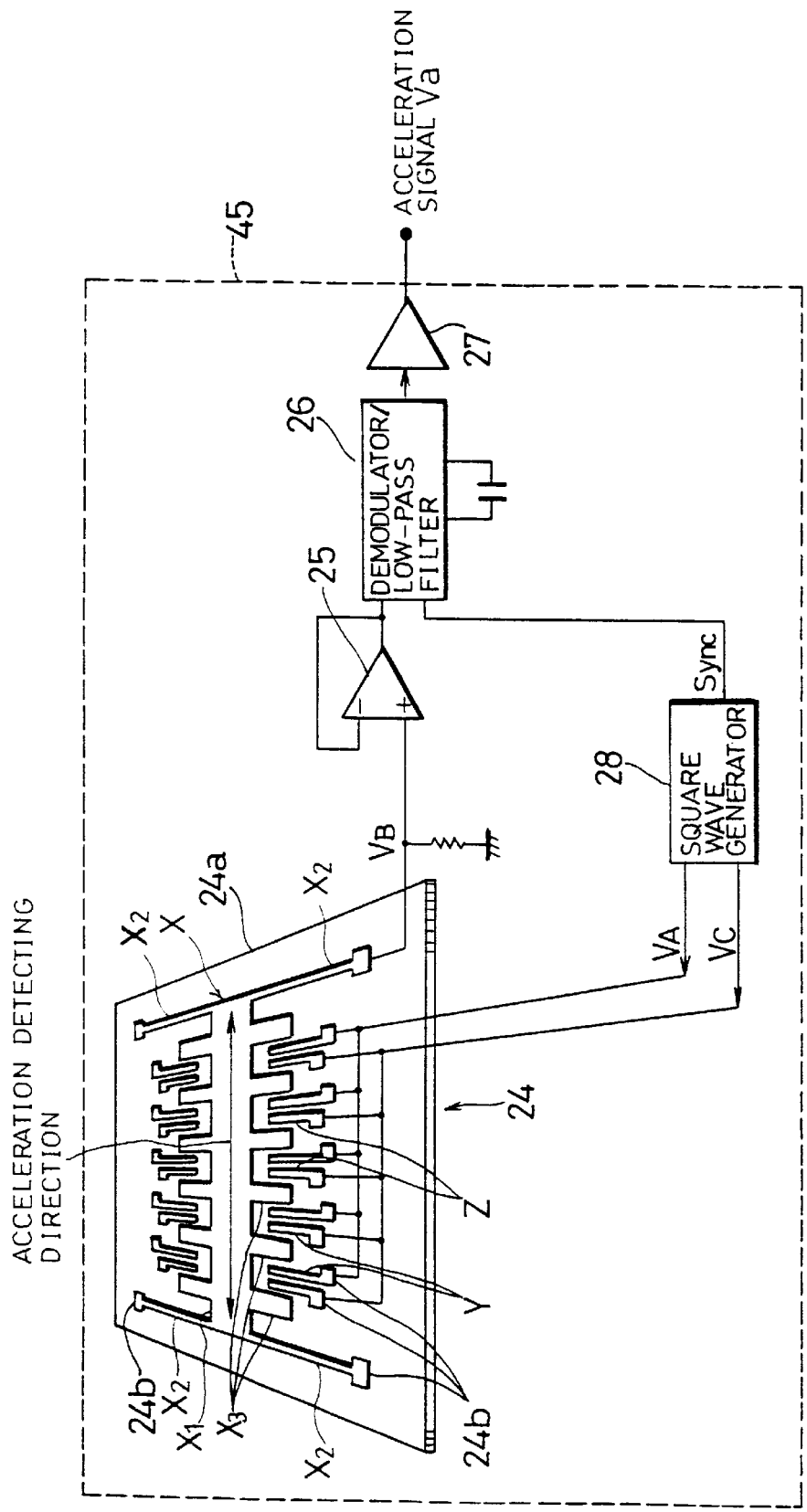
FIG. 20 is a schematic drawing showing an arrangement and a circuit of still another acceleration sensor unit of the motor control device in FIG. 14.

It is also possible to use an acceleration sensor unit 45 incorporating an acceleration detecting section 24 provided by growth of silicon polycrystal as shown in FIG. 20. The acceleration detecting section 24 is made through semiconductor process. More specifically, silicon polycrystal is provided to grow on a substrate 24a made of monocrystal. The grown polycrystal is then etched to provide a movable electrode X, fixed electrodes Y and fixed electrodes Z.

The movable electrode X is composed of a wide weight part $X_1$, flexible supporting parts $X_2$ and electrode parts $X_3$ functioning as electrodes. The weight part $X_1$, provided around the center of the substrate 24a, is slightly raised upwards and supported at its two edges by the supporting parts $X_2$ extending in four directions so as not to touch the substrate 24a. Distortion of the supporting parts $X_2$ shifts the weight part $X_1$ in a direction shown in FIG. 20 (an acceleration detecting direction). The electrode parts $X_3$ are provided on both sides of the weight part $X_1$ with the same spacing in between to extend orthogonally to the acceleration detecting direction in FIG. 20.

Figure 21A:
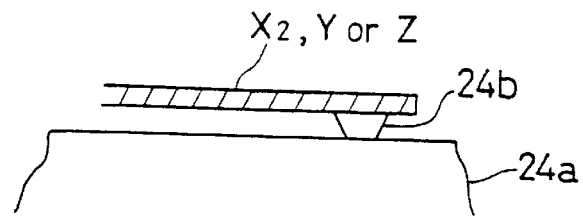
FIG. 21($a$) is a cross-sectional view showing a structure fixing a movable electrode and fixed electrodes to a substrate in the acceleration sensor unit in FIG. 20.
FIG. 21(b) is a circuit diagram showing an arrangement of a circuit converted equivalently from the movable electrode and the fixed electrodes in the acceleration sensor unit in FIG. 20.
FIG. 21(c) is a waveform drawing showing waveforms of signals generated by the acceleration sensor unit in FIG. 20.
Figure 21B:
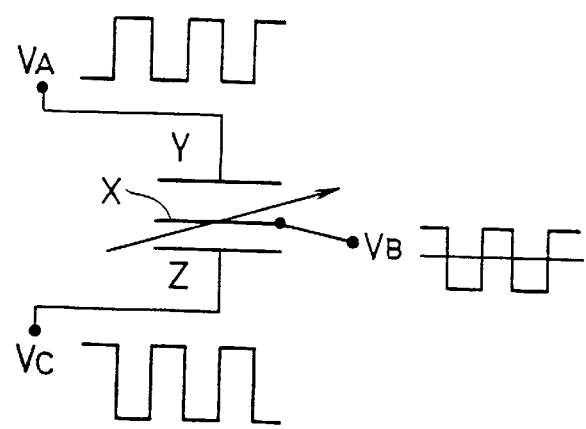
Figure 21C:
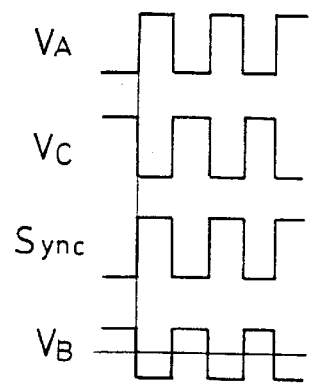

One of the fixed electrodes Y and one of the fixed electrodes Z are provided between each neighboring electrode parts $X_3$. Each of the fixed electrodes Y and Z is slightly raised upwards and fixed at one of the edges thereof to the substrate 24a so as not to touch the substrate 24a. The supporting parts $X_2$ and the fixed parts Y and Z are, as shown in FIG. 21(a), are fixed to the substrate 24a through a fixer 24b. The acceleration detecting section 24, as shown in FIG. 21(b), includes a variable capacitor having the electrode part $X_3$ and the fixed electrodes Y and Z.

In the acceleration detecting section 24, when an acceleration is applied to the weight part $X_1$ in the direction shown in FIG. 20, the movable electrode X is shifted relatively to the fixed electrodes Y and Z on the substrate 24a by a force of inertia. Therefore, the applied acceleration can be detected in accordance with its strength and direction as a relative and differential change of the electrostatic capacity between the movable electrode X and the fixed electrodes Y and Z.

Accordingly, rectangular wave signals $V_A$ and Vc are supplied from a rectangular wave generator 28 to the fixed electrodes Y and Z. The rectangular wave signals $V_A$ and Vc has phases opposite from each other as shown in FIG. 21(b) and frequencies much higher than that of the acceleration to be detected (for example, approximately 1 [MHz]). Then a signal $V_B$ is induced to the electrode part $X_3$ (the movable electrode X) by the electrostatic capacity between the electrode part $X_3$ and the fixed electrodes Y and Z. The signal $V_B$ changes its phase direction (the phase direction of $V_A$ or $V_C$) and amplitude in accordance with the differential electrostatic capacity between the movable electrode X and the fixed electrodes Y and Z.

The signal $V_B$ is inputted through the buffer amplifier 25 into a demodulator and low-pass filter 26. Here, the signal $V_B$ is demodulated in synchronization with the synchronization signal Sync from the rectangular wave generator 28 (synchronous detection). Then, the lower frequency component of the signal $V_B$ is extracted. An electric signal obtained through amplification of the lower frequency component by the amplifier 27 is outputted as an acceleration signal Va in accordance with the acceleration.

As shown in FIG. 27(c), the synchronization signal Sync is a signal synchronizing with the rectangular wave signals $V_A$ and $V_C$ and changing in the same manner as the rectangular wave signal $V_A$. The synchronization signal Sync may be a signal changing in the same manner as the rectangular wave signal $V_C$ (this is not shown). Alternatively, the frequency of the synchronization signal Sync may be different from the frequencies of the rectangular wave signals $V_A$ and $V_C$.

Figure 22:
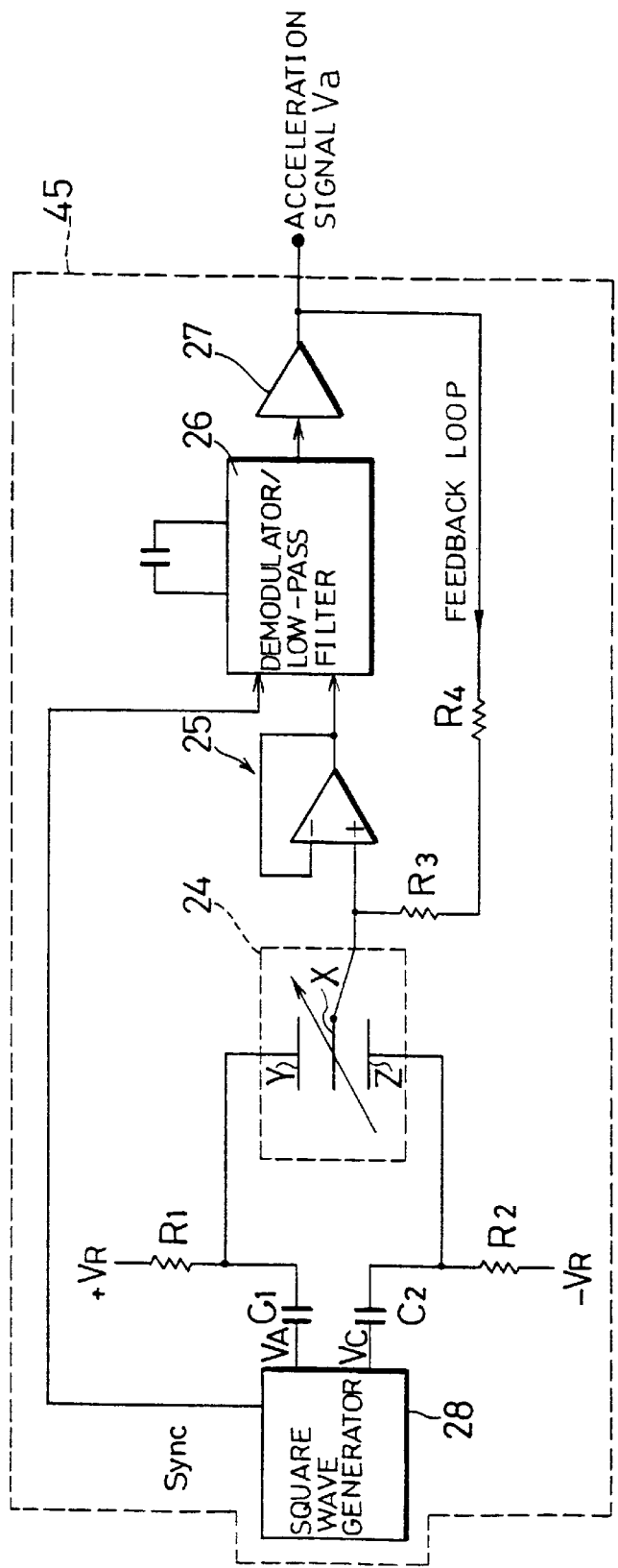
FIG. 22 is a circuit diagram showing a modified variation of the acceleration sensor unit in FIG. 20.

It is also possible to arrange an acceleration sensor unit 45 as follows. As shown in FIG. 22, the acceleration sensor unit 45 here incorporates two new circuits in addition to the acceleration unit 45 having the acceleration detecting section 24 shown in FIG. 20. One of the new circuits includes capacitors $C_1$ and $C_2$ and resistors $R_1$ and $R_2$. In this circuit, a rectangular wave generator 28 outputs rectangular wave signals $V_A$ and $V_C$ through the capacitors $C_1$ and $C_2$ to fixed electrodes Y and Z respectively. Reference voltages $+V_R$ and $-V_R$ are applied to the fixed electrodes Y and Z through the resistors $R_1$ and $R_2$ respectively as bias voltages.

The other circuit includes resistors $R_3$ and $R_4$ connecting the output terminal of an amplifier 27 and the positive input terminal of a buffer amplifier 25. A feedback loop is provided by the circuit, the buffer amplifier 25, a demodulator and low-pass filter 26 and the amplifier 27. The feedback loop feeds back an acceleration signal Va from the amplifier 27 through the resistors $R_3$ and $R_4$ to a movable electrode X.

In the acceleration sensor unit 45 arranged as above, movement of the movable electrode X caused by acceleration is converted into a change in the electrostatic capacity and detected as the acceleration signal Va. The acceleration signal Va is fed back into the movable electrode X as described above. Therefore, an electrostatic force is generated between the movable electrode X and the fixed electrodes Y and Z by the acceleration signal Va and the reference voltages $+V_R$ and $-V_R$. The electro static force works in the reverse direction of the force of inertia caused by the acceleration of the movable electrode X. This reduces the shift of the movable electrode X nearly to nil.

The acceleration signal Va in the acceleration sensor unit 45 above works as a voltage to generate the electro static force retaining the movable electrode X at its original position against the force of inertia caused by the acceleration. This is the difference between the acceleration sensor units 45 shown in FIGS. 20 and 22 in using the acceleration signal Va.

As mentioned above, the acceleration sensor unit 45 produced with micro machining technology is a kind of integrated circuit with the acceleration detecting part and its peripheral circuits integrated on one chip. Consequently, the acceleration sensor unit 45 thus produced not only comes smaller in size, but also offer a better productivity than the acceleration sensor unit 45 having the arrangement shown in FIG. 16.

Figure 14:
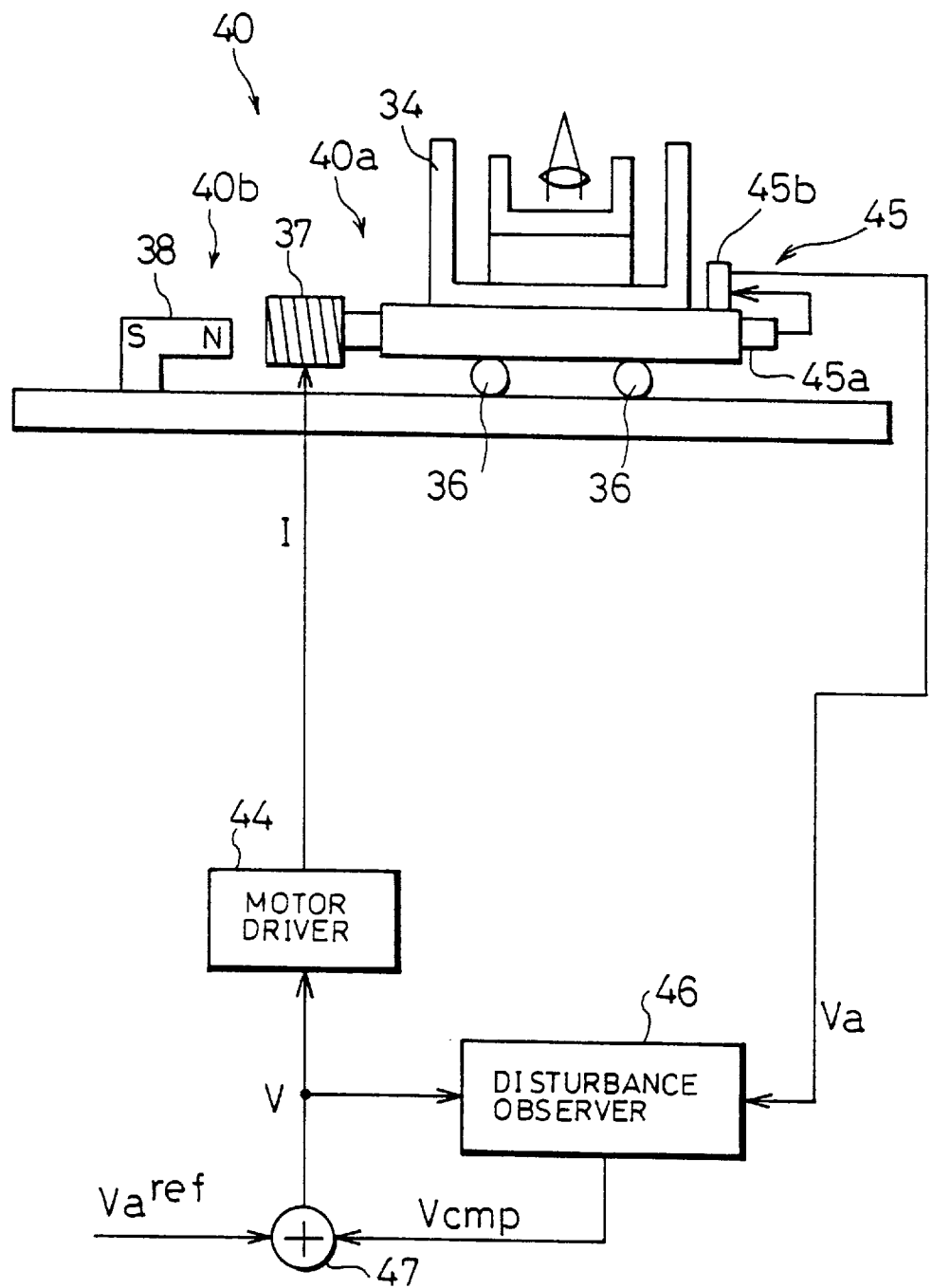
FIG. 14 is a schematic drawing showing an arrangement of main parts of the motor control device in FIG. 13.

As shown in FIGS. 13 and 14, the optical disk device has a disturbance observer 46, an adder 47 and a motor driver 44. FIG. 14 only shows the disturbance observer 46 and its related parts.

The disturbance observer 46 is a circuit for compensating for a drive voltage reference value $Va^{ref}$ from a second phase compensating circuit 42 on the basis of the acceleration signal Va from the acceleration sensor unit 45. The adder 47 is a circuit for adding the drive voltage reference value $Va^{ref}$ with a compensating voltage signal Vcmp from the disturbance observer 46 and thus outputting a drive voltage signal V.

The motor driver 44 is a circuit for converting the drive voltage signal V from the adder 47 into a drive current signal I. The motor driver 44 may be arranged in various ways: for example, a circuit converting an inputted signal having a voltage dimension into a signal having a current dimension with a transfer gain of '1' and outputting the converted signal in order to drive the linear motor 40. The circuit, in other words, converts the drive voltage signal V (described in unit [V]) into the equivalent drive current signal I (described in unit [A]). Such a circuit can be realized, for example, by setting Rs to 1 [Ω] in the driver in FIG. 12 of the first embodiment.

In the motor control device, since the motor driver 44 has the transfer gain of 1 as described above, the motor driver 44 can be regarded as a block simply changing the dimension of a signal from voltage to current. Therefore, in the following description, unless otherwise specified, the drive voltage signal V, the compensating voltage signal Vcmp and the drive voltage reference value $Va^{ref}$ are replaced with the corresponding signals having the current dimension: namely I, Icmp and $Ia^{ref}$ respectively.

Figure 15:
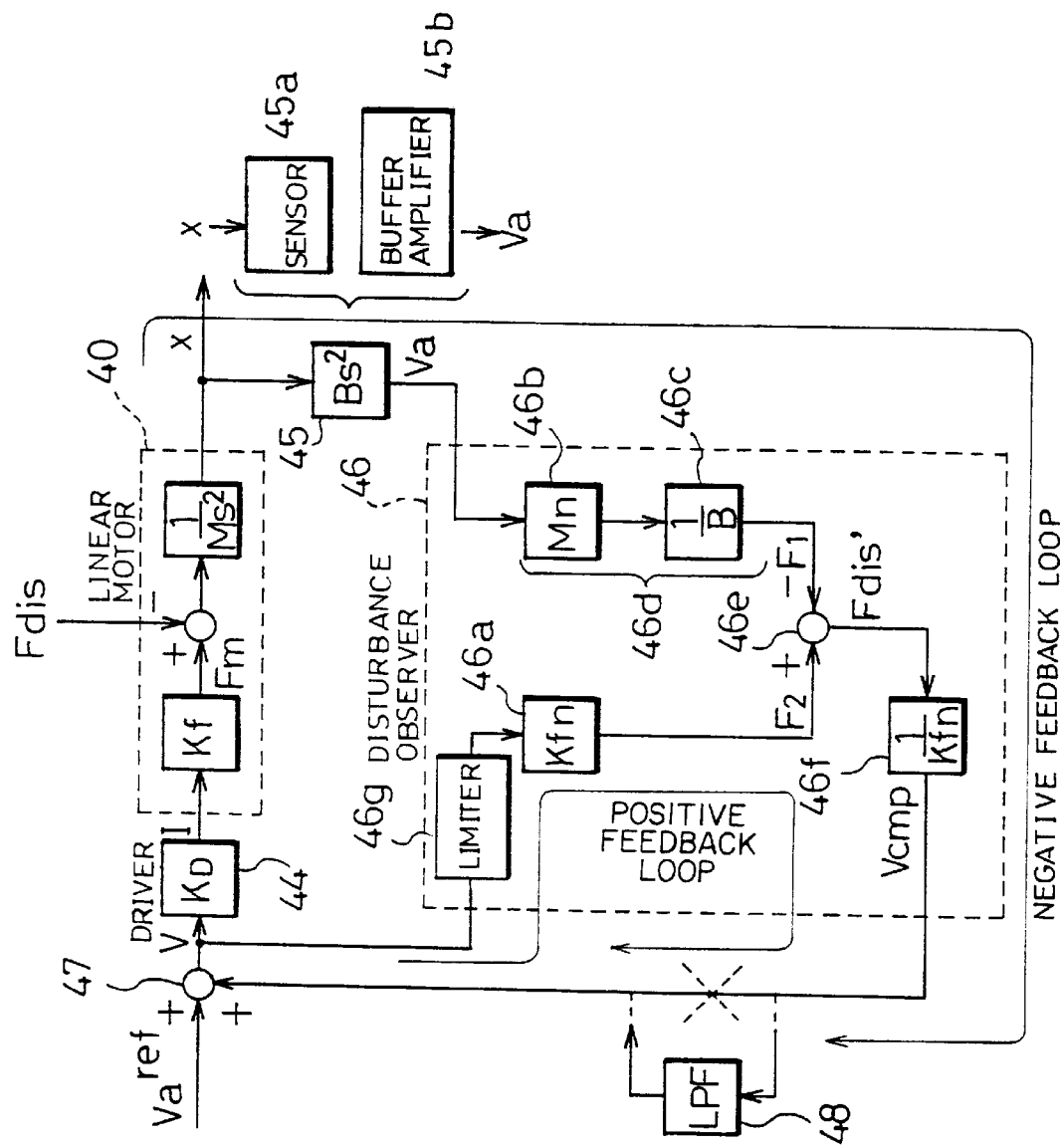
FIG. 15 is a block diagram showing an arrangement of the motor control device in FIG. 14.

FIG. 15 is a block diagram showing main parts of the motor control device in FIG. 14. Variables and the like shown in FIG. 15 are:

Kf (thrust constant of linear motor),

M (mass of movable section),

Kfn (nominal value of Kf, reference value),

Mn (nominal value of M, reference value),

B (sensitivity of acceleration sensor),

Fm (thrust of linear motor),

Fdis (external disturbance force including parameter variation),

Fdis' (estimated external disturbance force including parameter variation), $F_1$ (thrust estimated from acceleration through inverse operation), $F_2$ (thrust calculated from drive current) $Va^{ref}$ (drive voltage reference value for linear motor), V (actual drive voltage value for linear motor), Vcmp (voltage signal for compensating external disturbance), x (displacement of linear motor), and s Laplace operator.

The transfer function of the linear motor 40 is described in FIG. 15 as a second-order integral system having the thrust constant Kf and the mass M of the movable section 40a. The acceleration sensor unit 45 has the sensitivity of B described in FIG. 15 as '$Bs^2$' (the product of B and $s^2$ denoting a second-order differentiation) in order to detect acceleration from a displacement x of the linear motor 40.

The acceleration sensor unit 45 does not actually carry out a differentiating operation. However, the operation of the acceleration sensor unit 45 includes $s^2$ to show that the acceleration sensor unit 45 detects the acceleration, which is the second-order differentiation of the displacement X.

The disturbance observer 46 estimates the external disturbance force Fdis from the acceleration signal Va and the drive voltage signal V, and then generates the compensating voltage signal Vcmp for compensating for the external disturbance force. The compensating voltage signal Vcmp is outputted to the adder 47.

The positive feedback loop of the disturbance observer 46 includes a limiter 46g and a block 46a. The limiter 46g is arranged, for example, in the same way as shown in FIGS. 4 through 7 of the first embodiment and limits amplitude of the inputted drive voltage signal V to a limiter voltage $V_{LIM}$ (described later in detail).

The block 46a is an amplifier having a gain which corresponds to a targeted characteristic from the drive voltage signal V to a nominal value of the drive force Fn, i.e., the nominal value of the thrust constant Kfn. The block 46a includes, for example, an amplifying circuit incorporating an OP amplifier as in FIG. 8 of the first embodiment.

The negative feedback loop of the disturbance observer 46 has amplifiers 46b and 46c. The amplifier 46b, provided after the acceleration sensor unit 45, has a gain of an ideal characteristic from the thrust Fm (a force driving the linear motor 40) to the acceleration ($s^2 \times X$), i.e., Mn, or the reciprocal number of 1/Mn. The amplifier 46c, provided after the amplifier 46b, has a gain of 1/B, or the reciprocal number of the sensitivity B, of the acceleration sensor unit 45.

Figure 8:
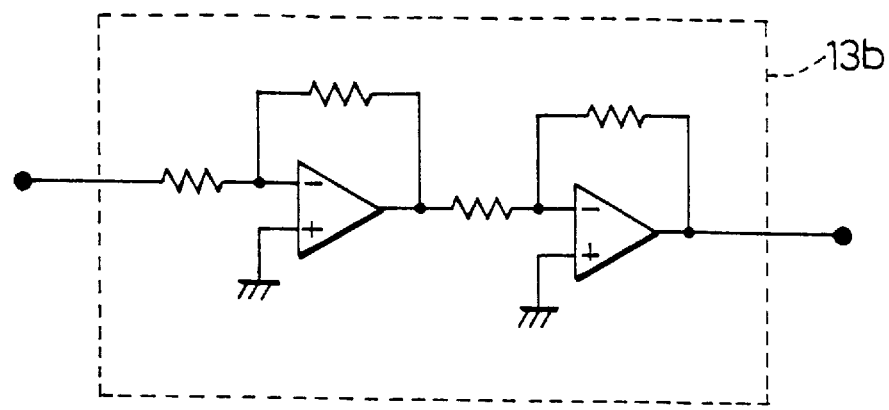
FIG. 8 is a circuit diagram showing an arrangement of a block of the motor control device.

The block 46d is composed of the amplifiers 46b and 46c. The block 46d estimates forces applied to the linear motor 40 including the disturbance force Fdis on the basis of the acceleration signal Va from the acceleration sensor unit 45 when the parameters of the linear motor 40 has nominal values. Therefore, the block 46d includes, for example, two inverting and amplifying circuits designed to have gains of Mn and 1/B respectively and connected in series as shown in FIG. 8.

Besides, the positive and negative feedback loops of the disturbance observer 46 share a comparator 46e and a block 46f. The comparator 46e includes, for example, a differential amplifying circuit incorporating an OP amplifier as shown in FIG. 9. The comparator 46e detects a difference between outputs from the block 46a and from the block 46d and outputs the estimated disturbance force Fdis' including parameter variations of the linear motor 40.

Figure 23:
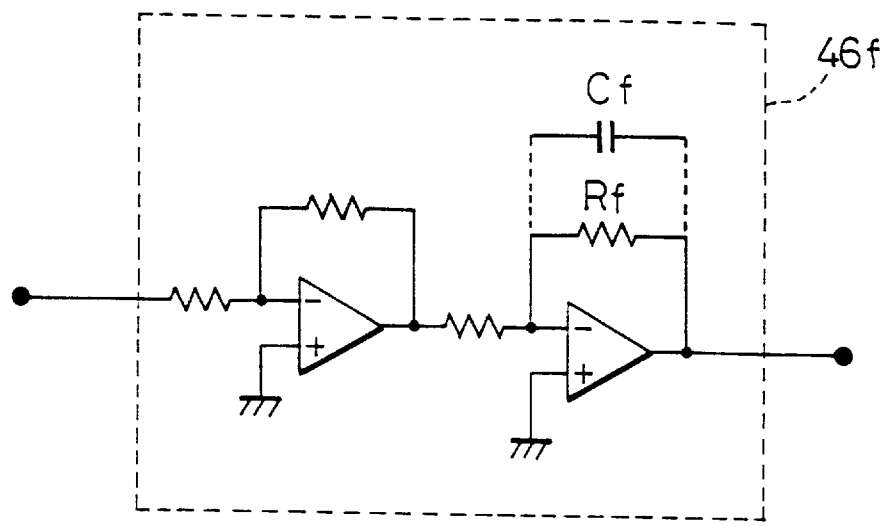
FIG. 23 is a circuit diagram showing an arrangement of an amplifier of the motor control device in FIG. 15.

The block 46f is an amplifier having a gain of the inverse characteristic of the block 46a, i.e., 1/Kfn (the reciprocal number of the nominal value of the thrust constant). The block 46f generates the compensating voltage signal Vcmp for compensating the reference value Va$^{ref}$ for the linear motor 40 on the basis of the external disturbance force Fdis in order to cancel Fdis'. The block 46f includes, for example, two inverting and amplifying circuits incorporating OP amplifiers as shown in FIG. 23. The adder 47 adds the compensating voltage signal Vcmp with the reference value Va$^{ref}$ from the second phase compensating circuit 42 and outputs the drive voltage signal V. The compensating voltage signal Vcmp is necessary for compensating the disturbance forces including parameter variations. The drive voltage signal V is inputted into the motor driver 44 and the disturbance observer 46. The adder 47 includes, for example, an inverting and amplifying circuit and an inverting, adding and amplifying circuit incorporating an OP amplifier connected to each other as shown in FIG. 10.

An LPF 48 is provided between the block 46f and the adder 47 if necessary. The addition of the LPF 48 makes it possible to limit the bandwidth of the disturbance observer 46. The bandwidth limitation by the LPF 48 can further reduce noise affection induced in a circuit and a sensor, and can stabilize operations of the disturbance observer 46 by suppressing high frequency mechanical resonance of the linear motor 40.

The LPF 48 includes, for example, a voltage follower incorporating an OP amplifier and a first-order RC low-pass filter incorporating a resistor and a capacitor as shown in FIG. 11 of the first embodiment. On the contrary, as shown by broken lines in FIG. 23, a capacitor Cf connected parallelly to a feedback resistor Rf of the inverting and amplifying circuit (the second circuit) enables the block 46f to obtain a characteristic equivalent to that of the LPF 48. The addition of the function of the LPF 48 to the block 46f eliminates necessity of the circuit shown in FIG. 11, thus facilitating an easier circuit arrangement.

The limiter voltage $V_{LIM}$ of the limiter 46g is described in detail here. Referring to the process determining the limiter voltage $V_{LIM}$ explained as in the first embodiment, the limiter voltage $V_{LIM}$ is determined as follows.

When the motor driver 44 is supplying the maximum drive current Imax to the linear motor 40, an inputted voltage $V_1$ of the motor driver 44 is given by the equation:

$$V_1 = (1/K_D) \times \text{Imax} \quad (17)$$

Meanwhile, an inputted voltage $V_2$ into the limiter 46g (the positive feedback loop side) of the disturbance observer, when the limiter 46g is beginning to carry out the amplitude limitation operation, is also applied to the motor driver 44 and equals $V_{LIM}$:

$$V_2 = V_{LIM} \quad (18)$$

With $V_1$ and $V_2$ given as above, the estimated (calculated) values of thrusts $F_1$ and $F_2$ from the respective negative and positive loop to the comparator 46e are given by the equations:

$$F_1 = [K_D \times (K_F/M) \times Mn] \times V_1 \quad (19)$$

$$F_2 = K_{Fn} \times V_2. \quad (20)$$

As in the first embodiment, when the motor driver 44 is supplying its maximum drive current value Imax to the linear motor 40, and $F_1$ and $F_2$ applied to the comparator 46e fulfill the equation:

$$F_1 \geq F_2, \quad (21)$$

the linear motor 40 can be prevented from being driven excessively.

With substitution of Equations (17), (18), (19) and (20), Equation (21) is rearranged as:

$$V_{LIM} \leq [(K_F/M)/(K_F n/Mn)] \times \text{Imax}. \quad (22)$$

The limiter voltage $V_{LIM}$ is thus obtained through Equation (22).

When the limiter 46g is placed right after the amplifier 46b having a gain of $K_F$n, Equations (18) and (20) are replaced with Equation (18') and (20'):

$$V_2 = V_{LIM}/K_F n \quad (18')$$

$$F_2 = V_{LIM}. \quad (20')$$

With substitution of Equations (18') and (19'), Equation (22) is rearranged as:

$$V_{LIM} \leq [(KF/M)/(1/Mn)] \times \text{Imax} \quad (22')$$

In Equations (18'), (20') and (22'), the left-hand side and the right-hand side have different physical dimensions. The same reasoning applies here as in Equation (13'), (15') and (16') in the first embodiment; that the limiter 46g can be considered to limit the force by limiting a signal level of voltage dimension.

When the left-hand side and the right-hand side are equal to each other in Equation (22) or (22'), the limiter 46g can operate at the optimum operating conditions. In this case, the signal amplitude of the positive feedback loop is not limited until the signal amplitude reaches the maximum drive ability of the driver 44. Therefore, the motor control system including the disturbance observer 46 can operate to its best ability.

However, the limiter voltage $V_{LIM}$ set slightly lower than the optimum value does not pose any practical problem. This is, in fact, more preferable in protecting the driver 44 because the limiter voltage $V_{LIM}$ of the limiter 46g is set lower than the maximum operating ability of the driver 44.

The addition of the limiter 46g does not affect durability of the disturbance observer 46 against the external disturbance, ability of the access operations and the like. This is because the durability and the ability of the disturbance observer 46 is limited by the ability of the driver 44 as in the first embodiment.

The control system in FIG. 1 of the embodiment 1 has the amplifiers 13d and 13e having the amplification degree of g×Jn/C as the gain term. The amplifiers 13d and 13e operate together with the adder 13c, the low-pass filter 13f and the comparator 13g to carry out the approximate differentiation of the output signal from the velocity sensor 8. The disturbance observer 13 improves the control characteristics of the motor by suppressing the disturbance in the bandwidth of the approximate differentiation whose upper limit is g. Therefore, the upper limit g of the bandwidth is preferably high.

However, in order to realize a higher upper limit g, the amplifiers 13d and 13e are required to have greater amplification degree. Especially, the servo control incorporating the linear motor 40 of the optical disk device of the present embodiment has a frequency bandwidth of a few hundreds [Hz] to a few [kHz]. This is approximately 10 times as high as that of the magnetic disk device of the first embodiment. The amplifiers thus must fulfill stricter requirement with respect to amplification degree necessary for the approximate differentiation if a velocity sensor is used in the optical disk device. For example, if a linear motor of an optical disk device is to have good characteristics up to 2 [kHz], the upper limit g of the bandwidth should be, generally, 2π×2000, or approximately 12600.

If the moment of inertia Jn of a rotary motor is replaced with the mass Mn of the movable section of a linear motor, and Mn/C is very small, it is possible to keep the gain (g×Mn/C) of the amplifier at a low value. But practically, Mn is 0.01 [kg] at lightest in a linear motor of an optical disk device. Besides, a direct acting velocity sensor provided to the linear motor has sensitivity in the order of 0.01 [V/m·s$^{-1}$] at highest. Taking this into account, it is evident that g×Mn/C cannot be much smaller than g and it is impossible to keep the gain of the amplifier at a low value.

It is not, generally, easy to produce an amplifier having such a high gain. If an OP amplifier is used to obtain the gain of 12600 for 2 [kHz], the OP amplifier needs to have a bandwidth including frequencies higher than 25 [MHz], or a several of OP amplifiers should be combined to provide such an OP amplifier. However, even when such an OP amplifier is realized by these arrangement, the amplifier amplifies noise of the amplifier and/or an input signal of the amplifier.

In the first embodiment, the approximate differentiation of s/(s+g) is carried out in the bandwidth whose upper limit is g in order to estimate the disturbance torque on the basis of the detected velocity information. The differentiation operation strengthens noise caused by the sensor and the circuit, and external noise. As a result, if the motor is controlled through the differentiation operation, the driver and the motor waste electricity and are heated up. Besides, the motor produces undesirable vibration and noise. If the bandwidth whose upper limit is g is to be expanded, the noise becomes greater accordingly. Therefore, the above problems become more serious in this case also.

On the contrary, since the motor control device of the present embodiment incorporates the acceleration sensor, the control device produces desirable effects including:

(1) It is possible to improve characteristics of the motor with respect to excessive motor drive, parameter variation and external disturbance.
(2) It is not necessary to carry out an approximate differentiation.
(3) There are few restrictions in selecting a mounting position of the sensor because the sensor is small and strong.
(4) An amplifier having a very high gain is not necessary in the disturbance observer in order to expand the control bandwidth. Affection of noise is thus reduced.

Third Embodiment

Referring to FIGS. 24 to 27, the following description will discuss still another embodiment of the present invention. Here, for convenience, members of the present embodiment that have the same function as members of the second embodiment, and that are mentioned in figures of the second embodiment are indicated by the same reference numerals and description thereof is omitted.

Figure 24:
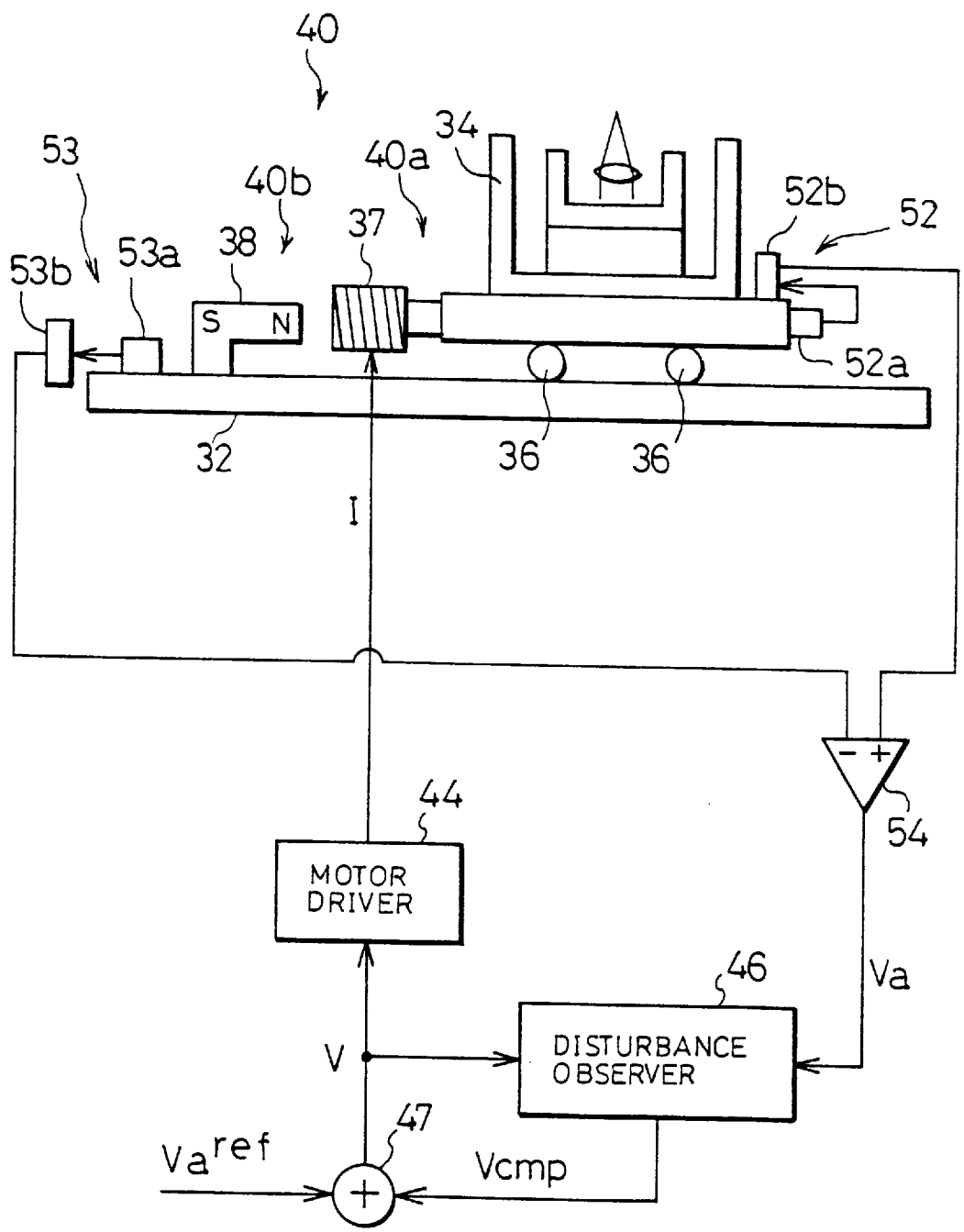
FIG. 24 is a schematic drawing showing main parts of a motor control device of still another embodiment in accordance with the present invention.

As shown in FIG. 24, a motor control device of an information recording and reproducing apparatus of the present embodiment has first and second acceleration sensor units 52 and 53 and a subtracter 54. The first and second acceleration sensor units 52 and 53 has the same function as the acceleration sensor unit 45 of the second embodiment (See FIG. 14).

The first acceleration sensor unit 52 is composed of a first acceleration sensor 52a and a first buffer amplifier 52b. The second acceleration sensor unit 53 is composed of a second acceleration sensor 53a and a second buffer amplifier 53b. The first and second buffer amplifiers 52b and 53b are composed of the same circuit as the acceleration sensor unit 45 (See FIG. 17).

The first acceleration sensor 52a and the first buffer amplifier 52b are provided to a movable section 40a of a linear motor 40. The second acceleration sensor 53a and the second buffer amplifier 53b are provided to a chassis 32.

An subtracter 54 calculates a difference between outputted signals from the first and second acceleration sensor units 52 and 53. The subtracter 54 outputs an acceleration signal Va to a disturbance observer 46.

The first and second acceleration sensor units 52 and 53 are provided to cancel acceleration having the same direction applied to the movable section 40a and a stationary section 40b. Therefore, the subtracter 54 cancels acceleration components of the same direction of a detected signal from the first and second buffer amplifiers 52b and 53b.

Incidentally, in general, absolute control of motion is, in most cases, not necessary in a device incorporating a motor. Motion control relative to a certain part of the device is only required.

For example, a track 31a on an optical disk 31 rotating on a spindle motor 33 shown in FIG. 13 displaces relatively to the chassis 32. Therefore, in order to control a laser beam 35 so that the laser beam 35 exactly follows the track 31a, the linear motor 40 needs to move an optical pickup 34 on the movable section 40a relatively to the stationary section 40b.

In order to fulfill the need, the present embodiment has an arrangement of detecting a difference between accelerations of the movable section 40a and the stationary section 40b. With the arrangement, when a reaction force from the movable section 40a to the stationary section 40b is substantial, the acceleration of the movable section 40a relative to the stationary section 40b is detected, including the acceleration caused by the reaction force. Consequently, the laser beam 35 can be controlled to exactly follow the track 31a and the linear motor 40 can be controlled more precisely.

Figure 25:
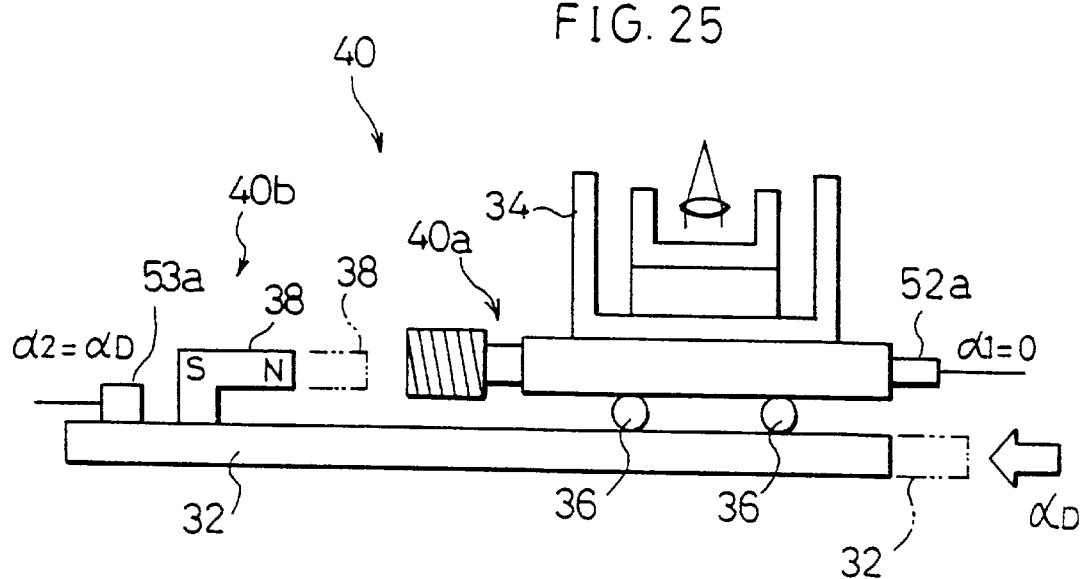
FIG. 25 is an explanatory drawing showing how a linear motor and acceleration sensors react to external disturbance.

Furthermore, when the chassis 32 receives external vibration or shock equivalent to an acceleration $\alpha_D$ as shown in FIG. 25, and rollers 36 of the linear motor 40 have very little friction, it is possible that the acceleration $\alpha_1$ detected at the movable section 40a equals 0 and the acceleration $\alpha_2$ detected at the stationary section 40b equals $\alpha_D$.

Under such conditions, no acceleration can be detected in the arrangement of the second embodiment where only the acceleration sensor 45a is provided. Consequently, the disturbance observer 46 does not suppress affection from vibration and shock.

Meanwhile, the present embodiment has an arrangement of the first and second acceleration sensors 52a and 53a provided to the movable and stationary sections 40a and 40b respectively. Consequently, a relative acceleration ($\alpha_1 - \alpha_2 = -\alpha_D$) can be detected. The disturbance observer 46 can therefore control driving of the movable section 40a without depending on an external reference value $Va^{ref}$ so that the motor receives no relative acceleration from vibration and shock, thereby suppressing affection by vibration and shock.

Figure 26:
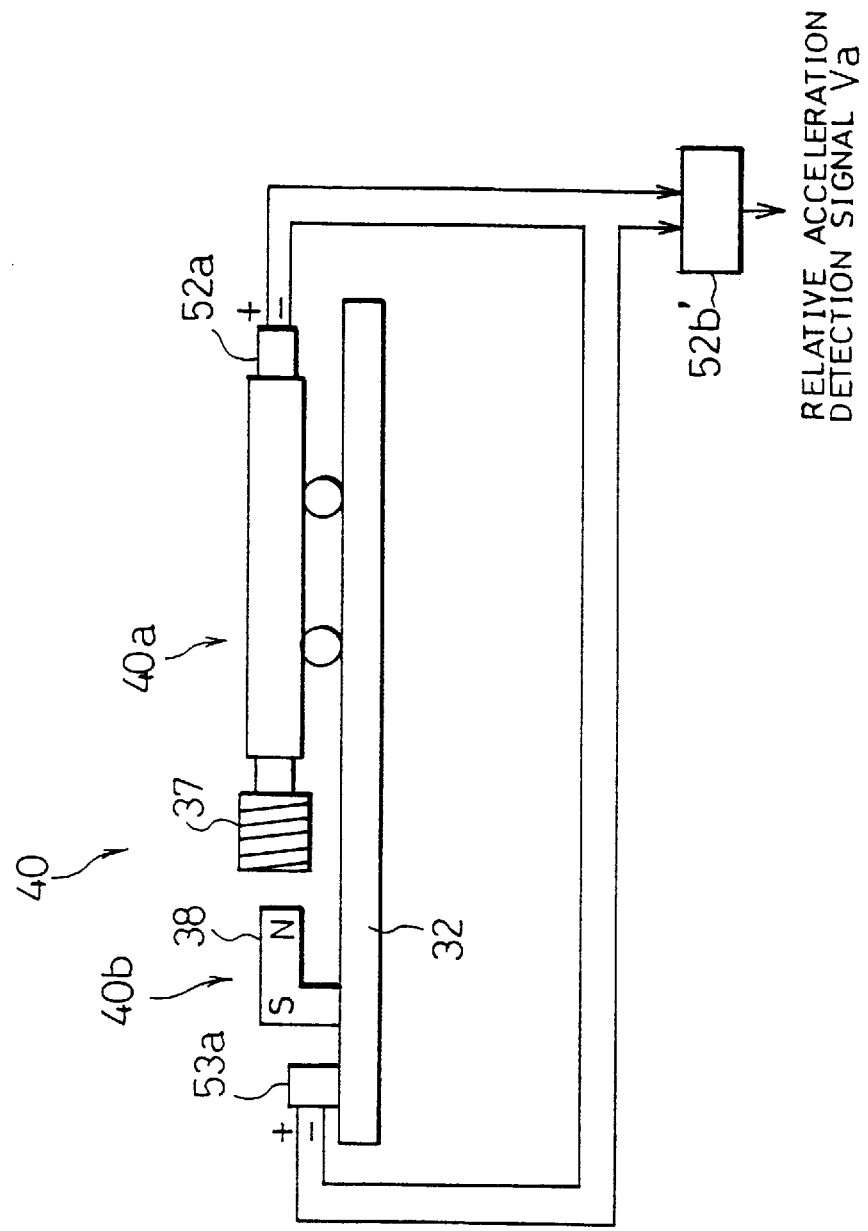
FIG. 26 is a schematic drawing showing another connection of acceleration sensors incorporated in the motor control device in FIG. 24.
Figure 27:
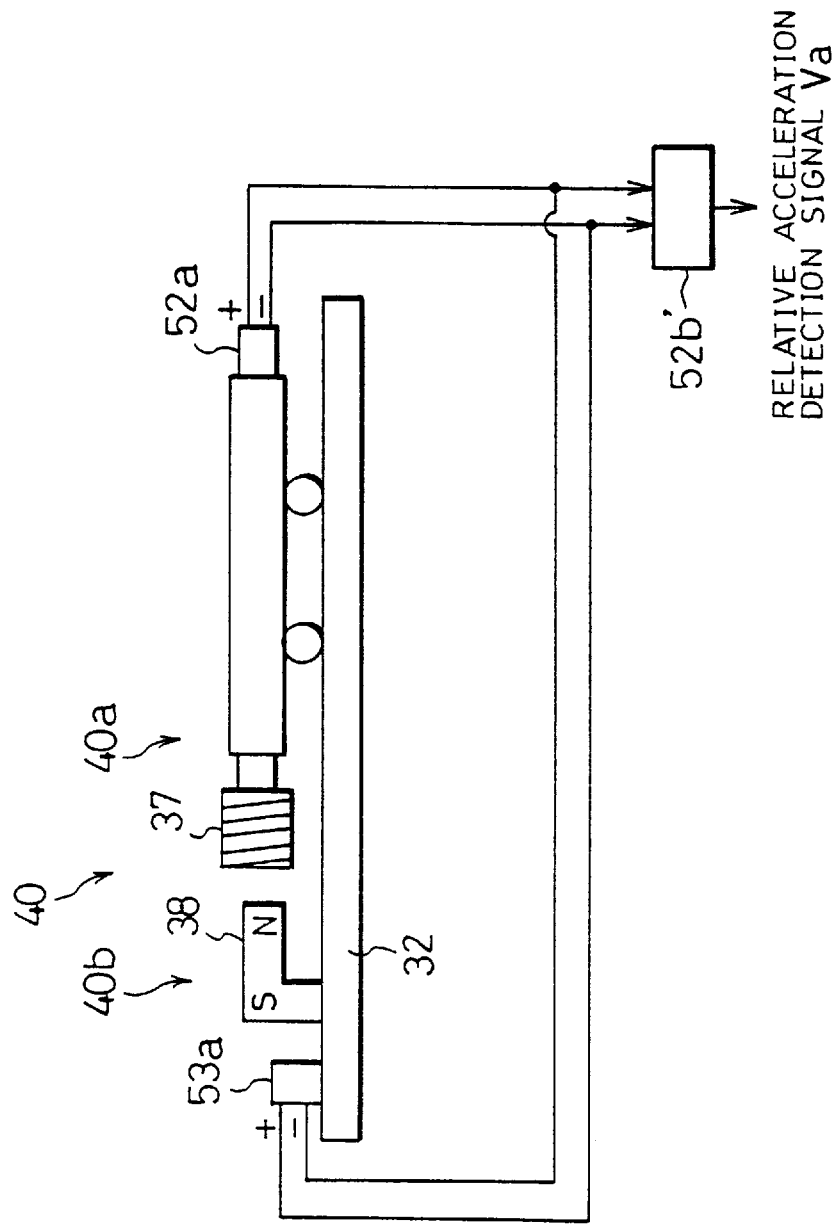
FIG. 27 is a schematic drawing showing still another connection of acceleration sensors incorporated in the motor control device in FIG. 24.
Figure 28:
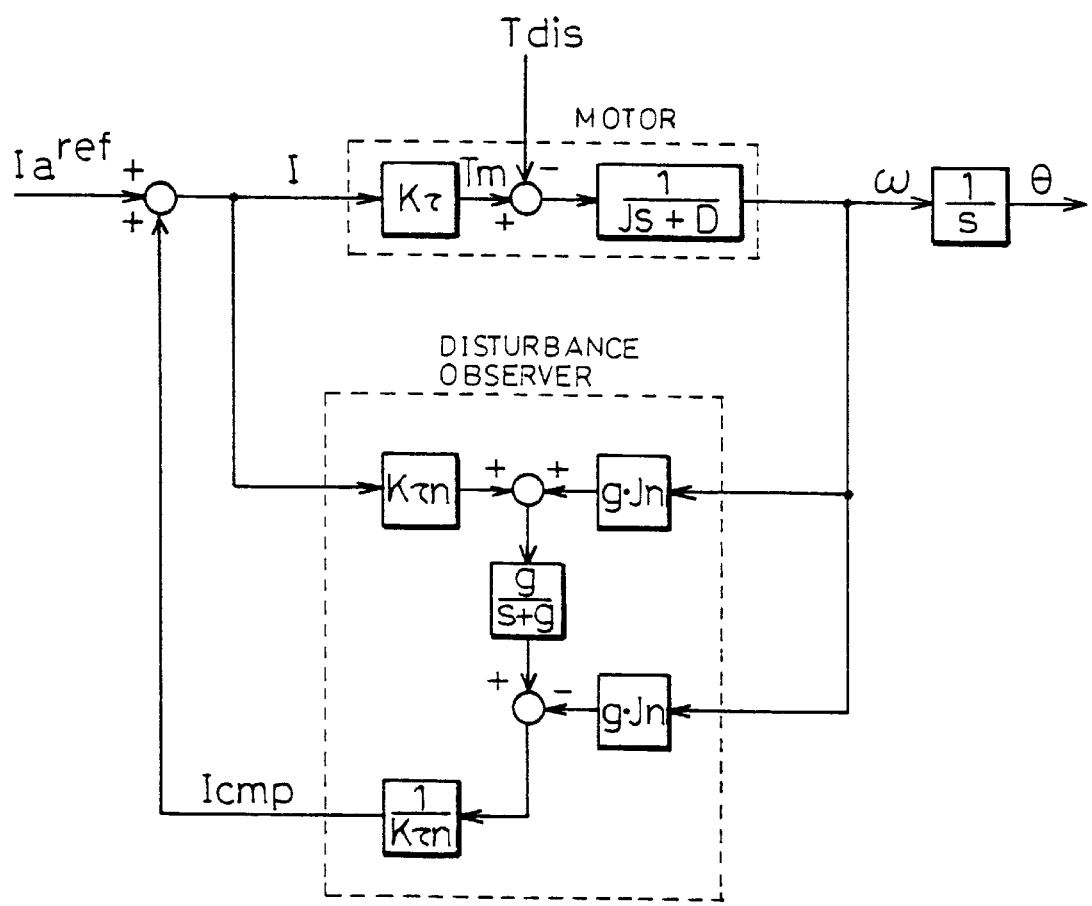
FIG. 28 is a block diagram showing an arrangement of a conventional motor control device adopting a disturbance observer.
Figure 29:
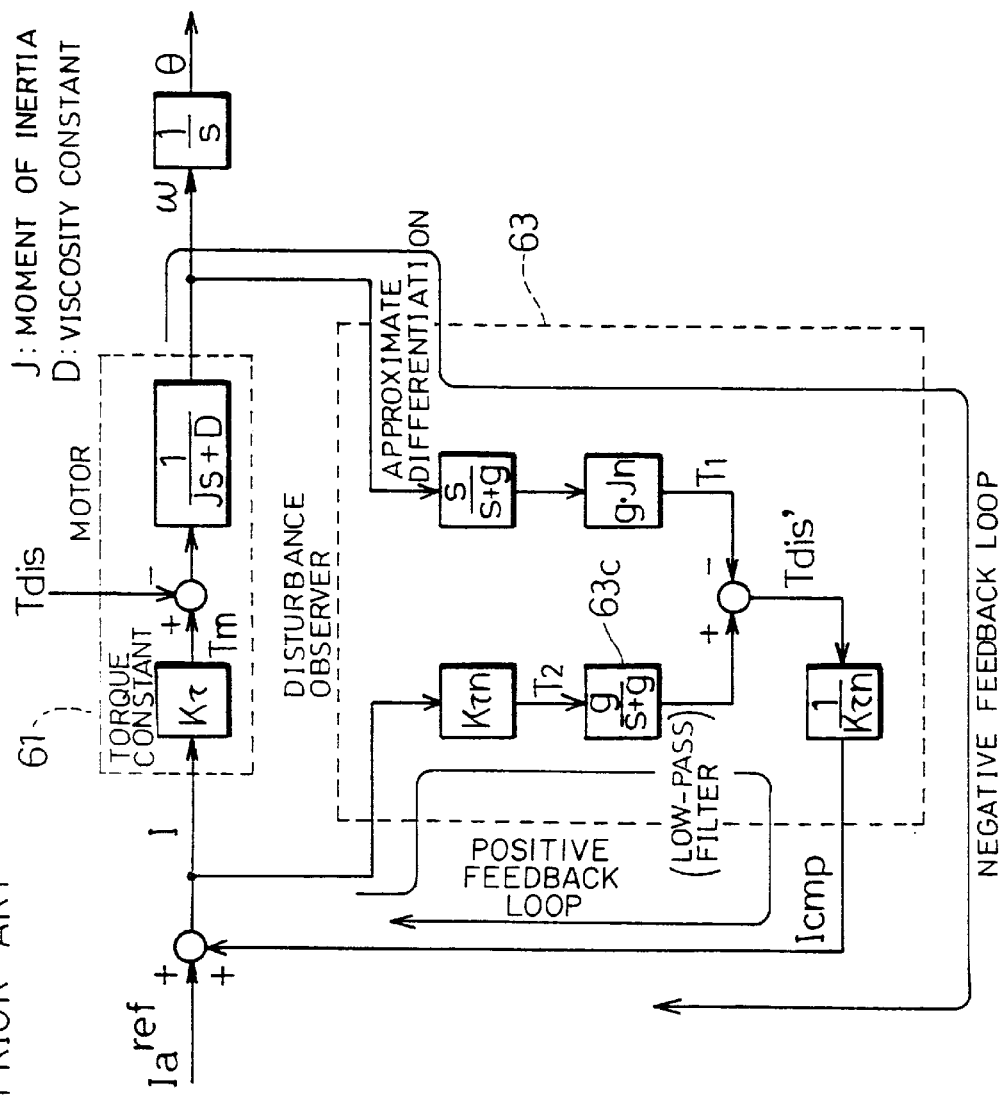
FIG. 29 is a block diagram showing an arrangement of the motor control device adopting a disturbance observer converted equivalently from the disturbance observer in FIG. 28.
Figure 30:
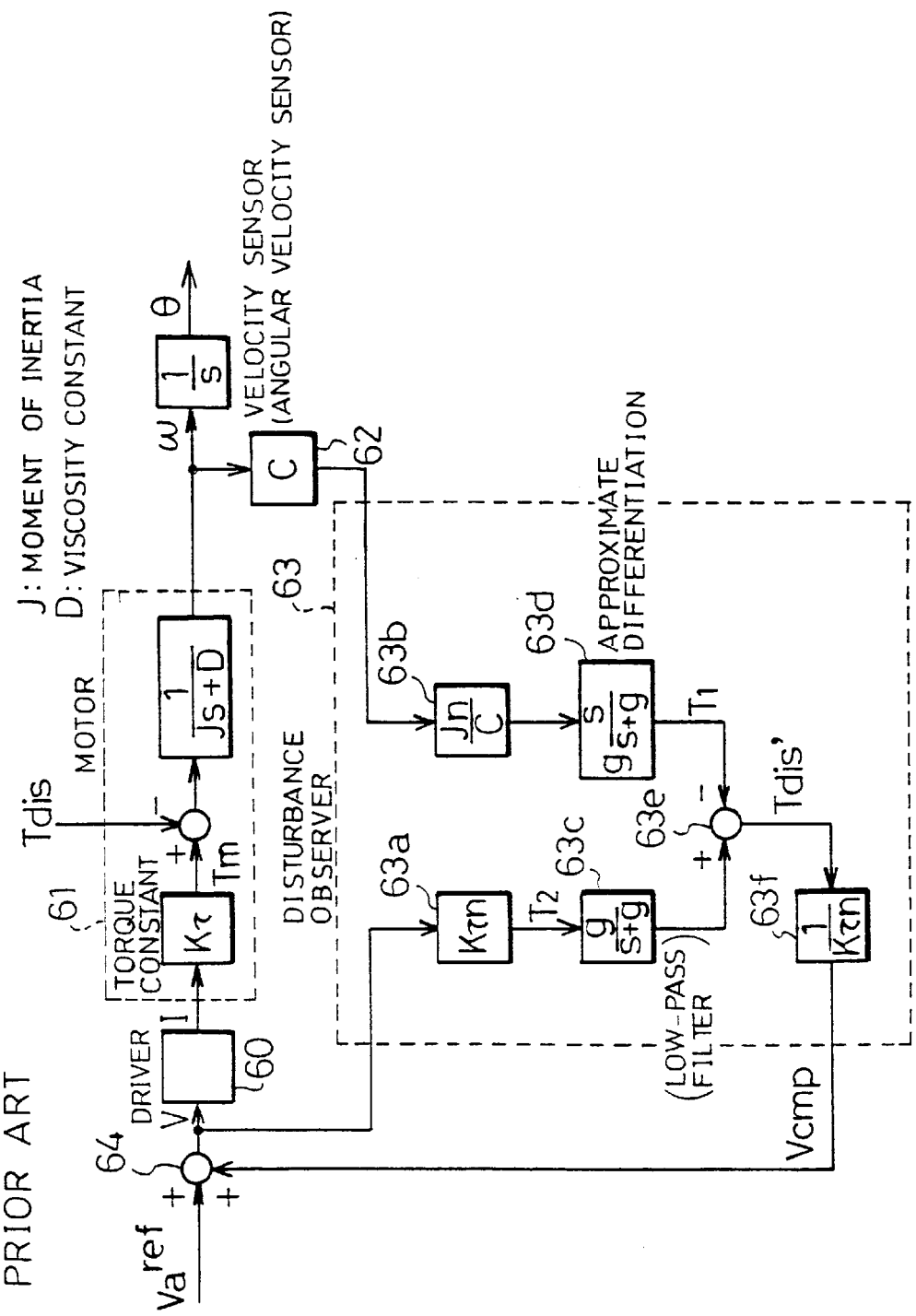
FIG. 30 is a block diagram showing the arrangement of the motor control device in FIG. 29 in more details.

The subtracter 54 calculates the difference between the outputs of the first and second buffer amplifiers 52b and 53b. However, in the present embodiment, such a subtracter 54 can be replaced with a buffer amplifier 52b' having the same function as the subtracter 54 as shown in FIGS. 26 and 27. Supplementary marks '+' and '−' of the first and second acceleration sensors 52a and 53a show voltage or current polarity generated by acceleration in the same direction. In the arrangement shown in FIG. 26, the negative output terminals of the first and second acceleration sensors 52a and 53a are connected to each other, and the positive output terminals of the first and second acceleration sensors 52a and 53a are connected to respective terminals of the buffer amplifier 52b'. In the arrangement shown in FIG. 27, the positive output terminal of the first acceleration sensor 52a and the negative output terminal of the second acceleration sensor 53a are connected to one of the two input terminals of the buffer amplifier 52b', and the negative output terminal of the first acceleration sensor 52a and the positive output of the second acceleration sensor 53a are connected to the other terminal of the buffer amplifier 52b'.

It is possible to use a circuit equivalent to the buffer amplifier 45b of the first embodiment (See FIG. 17) as the buffer amplifier 52b'. It is also possible to use the acceleration sensor unit 45 of the second embodiment (See FIGS. 18 through 20) as the first and second acceleration sensor units 52 and 53.

The invention being thus described, it will be obvious that the same may be varied in many ways. Such variations are not to be regarded as a departure from the spirit and scope of the invention, and all such modifications as would be obvious to one skilled in the art intended to be include within the scope of the following claims.

What is claimed is:

1. A motor control device of an information recording and reproducing device, comprising:

recording and reproducing means for recording information into a disk-shaped recording medium and/or reproducing information out of a disk-shaped recording medium;

a motor for moving said recording and reproducing means over the disk-shaped recording medium;

drive means for generating a drive signal for driving said motor according to an input signal;

detecting means for detecting an operating condition of said recording and reproducing means moved by said motor;

compensating means for generating, in response to the input signal and a detected signal from said detecting means, a compensation signal compensating for external disturbance applied to said motor and characteristics change of said motor, and for compensating for the input signal in accordance with the compensation signal; and amplitude limiting means for limiting amplitude of the input signal inputted into said compensating means so that the amplitude does not exceed a maximum amplitude at which said drive means generates a maximum drive signal within a drive ability of said drive means.

2. The motor control device defined in claim 1, wherein said detecting means is acceleration means for detecting the operating condition of said recording means as acceleration without differentiating velocity.

3. The motor control device as defined in claim 2, wherein said acceleration detecting means includes a piezoelectric converter for converting into an electric signal, amount of distortion of the piezoelectric converter mechanically caused by the acceleration.

4. The motor control device as defined in claim 3, wherein said piezoelectric converter includes a piezoelectric element for producing piezoelectric effect.

5. The motor control device as defined in claim 3, wherein said piezoelectric converter includes:

a vibrator provided so as to be mechanically displaced;

pressure sensitive resistors having variable resistance depending on amount of the displacement of said vibrator;

resistors providing a bridge circuit together with said pressure sensitive resistors; and a differential amplifier for detecting imbalance of resistance values of said bridge circuit.

6. The motor control device as defined in claim 3, wherein said piezoelectric converter includes:

first fixed electrodes and second fixed electrodes provided parallelly to each other;

a movable electrode, provided so as to be mechanically displaced, for providing capacitors together with said first and second fixed electrodes;

a rectangular wave generator for supplying a first rectangular wave signal to said first fixed electrode and a second rectangular wave signal to said second fixed electrodes, the two rectangular wave signals having opposite phases from each other; and a detecting circuit for demodulating an output signal from said movable electrode in synchronization with the two rectangular wave signals, and for extracting low-frequency component from the demodulated signal.

7. The motor control device as defined in claim 6, wherein said piezoelectric converter further includes a feedback loop for feeding a detected signal from said detecting circuit back to the output signal from said movable electrode.

8. The motor control device as defined in claim 2, wherein said acceleration detecting means detects a relative acceleration between stationary and movable sections of said motor, the movable section moving said recording and reproducing means.

9. The motor control device as defined in claim 8, wherein said motor is a linear motor.

10. The motor control device as defined in claim 8, wherein said acceleration detecting means includes:

a first acceleration sensor fixed to the movable section;

a second acceleration sensor fixed to the stationary section; and a cancelling section for canceling acceleration components of the same direction in detected signals from said respective first and second acceleration sensors.

11. The motor control device as defined in claim 10, wherein said cancelling section includes a subtracter for calculating a difference between the two detected signals from said respective first and second acceleration sensors.

12. The motor control device as defined in claim 10, wherein said cancelling section includes a buffer amplifier having two input terminals, one of the two input terminals being connected to a positive output terminal of said first acceleration sensor and to a negative output terminal of said second acceleration sensor, the other input terminal being connected to a negative output terminal of said first acceleration sensor and to a positive output terminal of said second acceleration sensor.

13. The motor control device as defined in claim 10, wherein said cancelling section includes a buffer amplifier having two input terminals, one of the two input terminals being connected to a positive output terminal of said first acceleration sensor, the other input terminal being connected to a positive output terminal of said second acceleration sensor, and negative output terminals of said first and second acceleration sensors are connected to each other.

14. The motor control device as defined in claim 10, wherein said first and second acceleration sensors are piezoelectric elements for converting into an electric signal, amount of distortion of piezoelectric elements mechanically caused by the acceleration by piezoelectric effect.

15. The motor control device as defined in claim 1, wherein said amplitude limiting means includes:
 a first voltage follower;
 a first diode whose cathode is connected to the input terminal of said first voltage follower;
 a second diode whose anode is connected to the input terminal of said first voltage follower;
 a first DC power source, connected to the anode of said first diode and the ground, for biasing in reverse said first diode; and
 a second DC power source, connected to the cathode of said second diode and the ground, for biasing in reverse said second diode.

16. The motor control device as defined in claim 15, wherein each of said first and second DC power sources includes:
 a second voltage follower; and
 an inverting amplifier connected to an output terminal of said second voltage follower.

17. The motor control device as defined in claim 1, wherein said amplitude limiting means includes:
 a voltage follower;
 a first group of diodes connected in series between the ground and the input terminal of said voltage follower; and a second group of diodes connected in series between the ground and the input terminal of said voltage follower, each diode of said second group being connected in the reverse direction of each diode of said first group.

18. The motor control device as defined in claims 17, wherein said first and second groups of diodes include different kinds of diodes from each other.

19. A motor control device of an information recording and reproducing device, comprising:

recording and reproducing means for recording information into a disk-shaped recording medium and/or reproducing information out of a disk-shaped recording medium;

a motor for moving said recording and reproducing means over the disk-shaped recording medium;

drive means for generating a drive signal for driving said motor according to an input signal;

detecting means for detecting an operating condition of said recording and reproducing means moved by said motor; and compensating means for generating a compensation signal that includes
 amplitude limiting means for limiting amplitude of the input signal,
 a first estimator section for outputting a first estimated drive force by estimating, in accordance with the input signal, a drive force of said motor when a maximum drive current is being supplied,
 a second estimator section for outputting a second estimated drive force by estimating, in accordance with a detected signal from the detecting means, the drive force of said motor when the maximum drive current is being supplied,
 said compensating means for generating a compensation signal compensating for external disturbance applied to said motor and characteristics change of said motor in accordance with the first and second estimated drive forces, and for compensating for the input signal in accordance with the compensation signal, and wherein the amplitude limiting means limits the amplitude of the input signal so the first estimated drive force is greater than or equal to the second estimated drive force.

* * * * *